US012725488B2

(12) United States Patent
Meyer et al.

(10) Patent No.: US 12,725,488 B2
(45) Date of Patent: Sep. 1, 2026

(54) ELECTRONIC GAMING SYSTEM WITH MULTIPLE AWARDABLE MARKER MECHANICS

(71) Applicant: Aristocrat Technologies Australia Pty Limited, North Ryde (AU)

(72) Inventors: Jason Meyer, Wyoming (AU); Antoon Visser, Coogee (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/211,121

(22) Filed: Jun. 16, 2023

(65) Prior Publication Data

US 2023/0334950 A1 Oct. 19, 2023

Related U.S. Application Data

(63) Continuation of application No. 16/827,919, filed on Mar. 24, 2020, now Pat. No. 11,735,007.

(30) Foreign Application Priority Data

May 17, 2019 (AU) ................................ 2019901678
Sep. 27, 2019 (AU) ................................ 2019236736

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3267; G07F 17/3213; G07F 17/34
See application file for complete search history.

(56) References Cited

U.S. PATENT DOCUMENTS 6,095,921 A * 8/2000 Walker .................... G07F 17/32 273/138.2
11,735,007 B2 * 8/2023 Meyer ................. G07F 17/3267 463/20

(Continued)

OTHER PUBLICATIONS

Office Action (Non-Final Rejection) dated Dec. 21, 2021 for U.S. Appl. No. 16/827,919 (pp. 1-17).

(Continued)

*Primary Examiner* — Jeffrey K Wong
(74) *Attorney, Agent, or Firm* — ALG Intellectual Property, LLC

(57) ABSTRACT

An electronic gaming system comprising a display, and a game controller that includes a processor and a memory device storing instructions to select and display a plurality of symbols in a respective plurality of display positions in a display area for each implemented game. The processor also adds a wild marker to each display position that includes a special symbol, each wild marker remaining persistent for subsequent games until a random trigger condition occurs. When a random trigger condition occurs, the processor adds a wild symbol to each display position that includes a wild marker, evaluates a game outcome based on the selected and displayed symbols inclusive of all added wild symbols, and awards a win amount if the outcome corresponds to a winning outcome.

20 Claims, 34 Drawing Sheets

(56) References Cited

U.S. PATENT DOCUMENTS

| | | | | |
|---|---|---|---|---|
| 2001/0024971 | A1* | 9/2001 | Brossard | G07F 17/3253 463/30 |
| 2003/0050111 | A1* | 3/2003 | Saffari | G07F 17/3255 463/25 |
| 2003/0171148 | A1* | 9/2003 | Weitz | H04N 21/4758 463/40 |
| 2008/0026831 | A1* | 1/2008 | Wright | G07F 17/3281 463/26 |
| 2008/0146346 | A1* | 6/2008 | Hardy | G07F 17/329 463/16 |
| 2009/0023490 | A1* | 1/2009 | Moshal | G07F 17/32 463/22 |
| 2010/0248811 | A1* | 9/2010 | Jaffe | G07F 17/3239 463/20 |
| 2013/0150142 | A1 | 6/2013 | Caputo | |
| 2013/0237307 | A1 | 9/2013 | Wotton | |
| 2013/0244787 | A1* | 9/2013 | Hafezi | G07F 17/3276 463/42 |
| 2014/0171173 | A1* | 6/2014 | Strom | G07F 17/3244 463/20 |
| 2015/0363998 | A1* | 12/2015 | Comeau | G07F 17/34 463/20 |
| 2016/0055705 | A1 | 2/2016 | Elias | |
| 2017/0301177 | A1* | 10/2017 | Pawloski | G07F 17/3244 |
| 2019/0096185 | A1 | 3/2019 | Meyer | |
| 2019/0147691 | A1 | 5/2019 | Grace | |
| 2020/0105092 | A1 | 4/2020 | Watkins | |
| 2020/0250921 | A1 | 8/2020 | Hiten | |
| 2020/0364985 | A1 | 11/2020 | Meyer | |
| 2021/0097811 | A1 | 4/2021 | Berman | |

OTHER PUBLICATIONS

Office Action (Non-Final Rejection) dated Sep. 16, 2022 for U.S. Appl. No. 16/827,919 (pp. 1-8).

Office Action (Notice of Allowance and Fees Due (PTOL-85)) dated Apr. 12, 2023 for U.S. Appl. No. 16/827,919 (pp. 1-9).

Australian Examination Report No. 1 issued in App. No. 2019236736 dated Feb. 12, 2025, 3 pages.

* cited by examiner

400

| | | Reel 1 (421) | Reel 2 (422) | Reel 3 (423) | Reel 4 (424) | Reel 5 (425) |
|---|---|---|---|---|---|---|
| 401 | Dragon | 2 | 2 | 2 | 2 | 2 |
| 402 | Pic1 | 7 | 4 | 3 | 4 | 10 |
| 403 | Pic2 | 11 | 4 | 4 | 3 | 8 |
| 404 | Pic3 | 14 | 10 | 3 | 8 | 14 |
| 405 | Pic4 | 27 | 9 | 7 | 8 | 12 |
| 407 | Pic5 | 17 | 11 | 9 | 4 | 16 |
| 408 | A | 8 | 4 | 2 | 4 | 8 |
| 409 | K | 12 | 6 | 4 | 4 | 8 |
| 410 | Q | 12 | 6 | 4 | 6 | 12 |
| 411 | J | 10 | 4 | 6 | 4 | 6 |
| 412 | 10 | 12 | 6 | 4 | 4 | 12 |
| 413 | Scatter | 5 | 1 | 1 | 2 | 5 |
| 414 | Stack | 8 | 5 | 18 | 14 | 32 |
| | Total | 145 | 72 | 67 | 67 | 145 |

*FIG. 4*

2400

| Weights for STACK SYMBOL | | |
|---|---|---|
| Symbol | ALL REELS | % Chance |
| Pic1 | 8 | 5.33% |
| Pic2 | 12 | 8.00% |
| Pic3 | 12 | 8.00% |
| Pic4 | 14 | 9.33% |
| Pic5 | 15 | 10.00% |
| Ace | 15 | 10.00% |
| King | 15 | 10.00% |
| Queen | 15 | 10.00% |
| Jack | 17 | 11.33% |
| Ten | 17 | 11.33% |
| Wild | 5 | 3.33% |
| Dragon | 5 | 3.33% |
| Total | 150 | |

*FIG. 24*

2500

| Wild Trigger Weights | | | | |
|---|---|---|---|---|
| No. of Spins | Trigger | No Trigger | Total | % |
| 1 to 11 | 1 | 999 | 1000 | 0.1% |
| 12 to 19 | 167 | 833 | 1000 | 16.7% |
| 20 to 22 | 75 | 925 | 1000 | 7.5% |
| 23 to 26 | 75 | 925 | 1000 | 7.5% |
| 27 to 30 | 400 | 600 | 1000 | 40.0% |
| 31 onwards | 500 | 500 | 1000 | 50.0% |

*FIG. 25*

2600

| Add Random Wild Weights | | | | |
|---|---|---|---|---|
| | Trigger | No Trigger | Total | % |
| Base game | 8 | 32 | 40 | 20.0% |
| Feature game | 8 | 32 | 40 | 20.0% |

FIG. 26

2700

| Number of Random Wilds Added | | | | | |
|---|---|---|---|---|---|
| Wilds | 1 | Wilds | 2 | Wilds | 3 |
| Wilds Added | Weight | Wilds Added | Weight | Wilds Added | Weight |
| 1 | 1 | 1 | 1 | 1 | 1 |
| 2 | 1 | 2 | 1 | 2 | 1 |
| 3 | 9 | 3 | 17 | 3 | 16 |
| 4 | 13 | 4 | 15 | 4 | 12 |
| 5 | 15 | 5 | 13 | 5 | 13 |
| 6 | 11 | 6 | 15 | 6 | 15 |
| 7 | 12 | 7 | 2 | 7 | 6 |
| 8 | 7 | 8 | 7 | 8 | 7 |
| 9 | 6 | 9 | 6 | 9 | 6 |
| 10 | 5 | 10 | 5 | 10 | 5 |
| 11 | 3 | 11 | 3 | 11 | 5 |
| 12 | 4 | 12 | 4 | 12 | 5 |
| 13 | 4 | 13 | 4 | 13 | 4 |
| 14 | 3 | 14 | 3 | 14 | 1 |
| 15 | 2 | 15 | 1 | 15 | 1 |
| 16 | 1 | 16 | 1 | 16 | 1 |
| 17 | 1 | 17 | 1 | 17 | 1 |
| 18 | 1 | 18 | 1 | Total | |
| 19 | 1 | Total | | | |
| Total | 100 | | 100 | | 100 |

FIG. 27A

2700

| Wilds | 4 |
|---|---|
| Wilds Added | Weight |
| 1 | 1 |
| 2 | 10 |
| 3 | 15 |
| 4 | 7 |
| 5 | 20 |
| 6 | 12 |
| 7 | 4 |
| 8 | 9 |
| 9 | 5 |
| 10 | 5 |
| 11 | 4 |
| 12 | 4 |
| 13 | 1 |
| 14 | 1 |
| 15 | 1 |
| 16 | 1 |
| Total | |
| | 100 |

| Wilds | 5 |
|---|---|
| Wilds Added | Weight |
| 1 | 1 |
| 2 | 16 |
| 3 | 14 |
| 4 | 12 |
| 5 | 17 |
| 6 | 11 |
| 7 | 7 |
| 8 | 6 |
| 9 | 4 |
| 10 | 5 |
| 11 | 3 |
| 12 | 1 |
| 13 | 1 |
| 14 | 1 |
| 15 | 1 |
| Total | |
| | 100 |

| Wilds | 6 |
|---|---|
| Wilds Added | Weight |
| 1 | 1 |
| 2 | 11 |
| 3 | 20 |
| 4 | 19 |
| 5 | 14 |
| 6 | 7 |
| 7 | 7 |
| 8 | 6 |
| 9 | 5 |
| 10 | 4 |
| 11 | 3 |
| 12 | 1 |
| 13 | 1 |
| 14 | 1 |
| Total | |
| | 100 |

| Wilds | 7 |
|---|---|
| Wilds Added | Weight |
| 1 | 1 |
| 2 | 20 |
| 3 | 20 |
| 4 | 20 |
| 5 | 18 |
| 6 | 3 |
| 7 | 4 |
| 8 | 4 |
| 9 | 4 |
| 10 | 3 |
| 11 | 1 |
| 12 | 1 |
| 13 | 1 |
| Total | |
| | 100 |

FIG. 27B

2700

| Wilds | 8 |
|---|---|
| Wilds Added | Weight |
| 1 | 1 |
| 2 | 30 |
| 3 | 26 |
| 4 | 10 |
| 5 | 7 |
| 6 | 8 |
| 7 | 4 |
| 8 | 4 |
| 9 | 4 |
| 10 | 4 |
| 11 | 1 |
| 12 | 1 |
| Total | 100 |

| Wilds | 9 |
|---|---|
| Wilds Added | Weight |
| 1 | 1 |
| 2 | 18 |
| 3 | 34 |
| 4 | 14 |
| 5 | 7 |
| 6 | 8 |
| 7 | 6 |
| 8 | 5 |
| 9 | 5 |
| 10 | 1 |
| 11 | 1 |
| Total | 100 |

| Wilds | 10 |
|---|---|
| Wilds Added | Weight |
| 1 | 1 |
| 2 | 30 |
| 3 | 34 |
| 4 | 14 |
| 5 | 6 |
| 6 | 6 |
| 7 | 4 |
| 8 | 3 |
| 9 | 1 |
| 10 | 1 |
| Total | 100 |

| Wilds | 11 |
|---|---|
| Wilds Added | Weight |
| 1 | 1 |
| 2 | 43 |
| 3 | 31 |
| 4 | 10 |
| 5 | 3 |
| 6 | 5 |
| 7 | 5 |
| 8 | 1 |
| 9 | 1 |
| Total | 100 |

FIG. 27C

2700

| Wilds | 12 |
|---|---|
| Wilds Added | Weight |
| 1 | 1 |
| 2 | 40 |
| 3 | 34 |
| 4 | 9 |
| 5 | 7 |
| 6 | 5 |
| 7 | 3 |
| 8 | 1 |
| Total | 100 |

| Wilds | 13 |
|---|---|
| Wilds Added | Weight |
| 1 | 5 |
| 2 | 50 |
| 3 | 22 |
| 4 | 10 |
| 5 | 9 |
| 6 | 3 |
| 7 | 1 |
| Total | 100 |

| Wilds | 14 |
|---|---|
| Wilds Added | Weight |
| 1 | 10 |
| 2 | 40 |
| 3 | 33 |
| 4 | 13 |
| 5 | 3 |
| 6 | 1 |
| Total | 100 |

| Wilds | 15 |
|---|---|
| Wilds Added | Weight |
| 1 | 10 |
| 2 | 45 |
| 3 | 41 |
| 4 | 3 |
| 5 | 1 |
| Total | 100 |

FIG. 27D

2700

| Wilds | 16 |
|---|---|
| Wilds Added | Weight |
| 1 | 68 |
| 2 | 30 |
| 3 | 1 |
| 4 | 1 |
| Total | 100 |

| Wilds | 17 |
|---|---|
| Wilds Added | Weight |
| 1 | 98 |
| 2 | 1 |
| 3 | 1 |
| Total | 100 |

| Wilds | 18 |
|---|---|
| Wilds Added | Weight |
| 1 | 99 |
| 2 | 1 |
| Total | 100 |

| Wilds | 19 |
|---|---|
| Wilds Added | Weight |
| 0 | 99 |
| 1 | 1 |
| Total | 100 |

FIG. 27E

2800

| Random Wild Markers (After Reset) | |
|---|---|
| Wilds Added | Weight |
| 1 | 33 |
| 2 | 33 |
| 3 | 14 |
| 5 | 20 |
| Total | 100 |

FIG. 28

ELECTRONIC GAMING SYSTEM WITH MULTIPLE AWARDABLE MARKER MECHANICS

RELATED APPLICATIONS

The present application is a continuation of and claims priority to U.S. patent application Ser. No. 16/827,919, filed Mar. 24, 2020, and entitled "An Electronic Gaming System with Multiple Awardable Marker Mechanics" which claims priority to Australian Patent Application No. 2019236736, filed Sep. 27, 2019, entitled "A Gaming System," and Australian Patent Application No. 2019901678, filed May 17, 2019, entitled "A Gaming System," all of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A gaming system is described that enables a player to accumulate wild markers over several base games until a random trigger condition occurs. When the trigger condition occurs all symbol positions that are marked with a wild marker receive a wild symbol. The random trigger condition may be independent of the displayed symbols, in which case wild symbols are added to the marked display positions only once, or the trigger condition may be dependent on the displayed symbols, for example display of at least 3 scatter symbols, in which case a feature commences that includes several feature games. In each feature game, all symbol positions that are marked with a wild marker receive a wild symbol. By accumulating as many wild markers as possible during a base game, the player is provided with enhanced winning outcomes, especially if a feature is triggered.

A gaming system is described wherein the number of wild symbols used to determine a game outcome during a feature game is at least partly dependent on the number of wild markers accumulated during previous base games that were implemented prior to occurrence of a trigger condition. During a base game a wild marker is added to each display position that includes a special symbol, and each wild marker is persistent for subsequent base games until the trigger condition occurs. When the trigger condition occurs, a wild symbol is added to each marked display position for each feature game and a win amount is awarded for each feature game if the outcome corresponds to a winning outcome.

A gaming system is described that comprises at least one display, and a game controller that includes at least one processor and at least one memory device. The at least one processor, the at least one memory device, and the at least one display are operably connected, and the at least one memory device stores computer-readable instructions for controlling the at least one processor to select and display a plurality of symbols in a respective plurality of display positions in a display area for each implemented game. The processor also adds a wild marker to each display position that includes a special symbol, each wild marker remaining persistent for subsequent games until a random trigger condition occurs. When a random trigger condition occurs, the processor adds a wild symbol to each display position that includes a wild marker, evaluates a game outcome based on the selected and displayed symbols inclusive of all added wild symbols, and awards a win amount if the outcome corresponds to a winning outcome.

A gaming system is described that comprises at least one display, and a game controller that includes at least one processor and at least one memory device. The at least one processor, the at least one memory device, and the at least one display are operably connected, and the at least one memory device stores computer-readable instructions for controlling the at least one processor to implement a base game. During the base game a plurality of symbols are selected and displayed in a respective plurality of display positions in a display area, and a wild marker is added to each display position that includes a special symbol, each wild marker remaining persistent for subsequent base games until a trigger condition occurs. The processor also implements a feature comprising a plurality of feature games when the trigger condition occurs. During each feature game, a wild symbol is added to each display position that includes a wild marker, a game outcome is evaluated based on the selected and displayed symbols inclusive of all added wild symbols, and a win amount is awarded if the outcome corresponds to a winning outcome. The number of wild symbols used to determine the game outcome during each feature game is at least partly dependent on the number of wild markers accumulated during the base games prior to occurrence of a trigger condition.

A method of gaming is described that comprises selecting a plurality of symbols from a set of symbols, displaying the selected symbols in a respective plurality of display positions in a display area for each implemented game, and adding a wild marker to each display position that includes a special symbol, each wild marker remaining persistent for subsequent games until a random trigger condition occurs. When a random trigger condition occurs, the method comprises adding a wild symbol to each display position that includes a wild marker, evaluating a game outcome based on the selected and displayed symbols inclusive of all added wild symbols, and awarding a win amount if the outcome corresponds to a winning outcome.

A gaming system is described that comprises at least one display, a game controller that includes at least one processor and at least one memory device. The at least one processor, the at least one memory device, and the at least one display are operably connected. The at least one memory device stores computer-readable instructions for controlling the at least one processor to select and display a plurality of symbols in a respective plurality of display positions in a display area for each implemented game, and display at least one wild marker when a special symbol is displayed in the display area, the at least one wild marker indicative of a current number of wild symbols to add to the display area when a random trigger condition occurs, and the at least one wild marker remaining persistent for subsequent games until the random trigger condition occurs. When a random trigger condition occurs, add at least one wild symbol to the display area such that at least one wild symbol according to the current number of wild symbols is added to at least one respective display position the display area, evaluate a game outcome based on the selected and displayed symbols inclusive of all added wild symbols; and award a win amount if the outcome corresponds to a winning outcome.

BRIEF DESCRIPTION OF THE DRAWINGS

FIG. 4 is a table illustrating example distributions of symbols on reel strips.

FIG. 24 is an example weight table used to determine which symbol replaces stack symbols on the reels.

FIG. 25 is an example weight table used to determine when a wild trigger occurs during a base game.

FIG. 26 is an example weight table used to determine when random wild markers are added during a base game.

FIGS. 27A, 27B, 27C, 27D, and 27E illustrate example weight tables used to determine how many random wild markers to add during a base game when a determination is made that at least one random wild marker is to be added.

FIG. 28 is an example weight table used to determine how many wild markers to add to a first base game after a wild trigger or feature trigger has occurred.

DETAILED DESCRIPTION

Embodiments of the present disclosure represent a technical improvement in the art of electronic gaming machines, systems, and operating for such electronic gaming machines or systems. For example, at least some embodiments of the present disclosure employ a display that provides a visual transformation of game characteristics. In such embodiments, a plurality of symbols are randomly selected for animated display at a plurality of symbol positions during a base game. When the plurality of symbols selected include one or more special symbols, the gaming machine uses an animation mechanics to animate wild markers at display positions that include the special symbols. As more base games are played, the animation mechanics continues to find opportunities to add more wild markers on the display. When a trigger condition occurs, the electronic gaming machine changes the display positions that have wild markers to display wild symbols, and find additional opportunities to add more wild markers on the display to change to wild symbols.

Further, the visual addition of the wild markers also provides an improved electronic game machine display such that the player may only need to focus on symbols being displayed, and visually changed, without being overly burdened by complicated calculations. Further, embodiments of the present disclosure also provide multiple visual wild marker opportunities in both base games and feature games are not conventional. Thus, embodiments of the present disclosure are not merely new game rules or simply new display patterns, but provide technologic improvements to game display in the art of electronic gaming machines and software for such electronic gaming machines. Moreover, the above example is not intended to be limiting, but merely exemplary of technologic improvements provided by some embodiments of the present disclosure. Technological improvements of other embodiments are readily apparent to those of ordinary skill in the art in light of the present disclosure.

Figure 1:
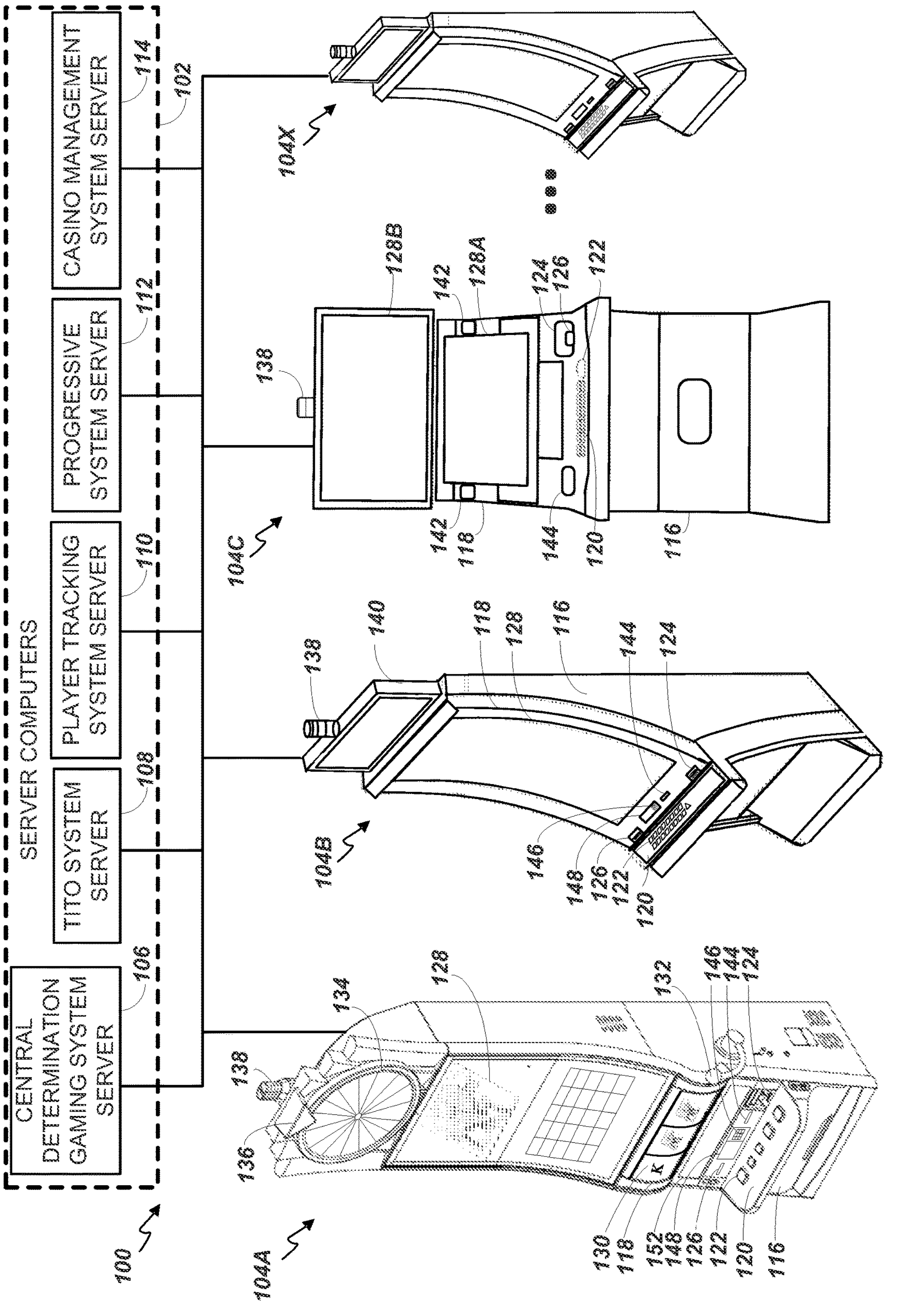
FIG. 1 is an exemplary diagram showing several EGMs networked with various gaming related servers.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player-tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a backlit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
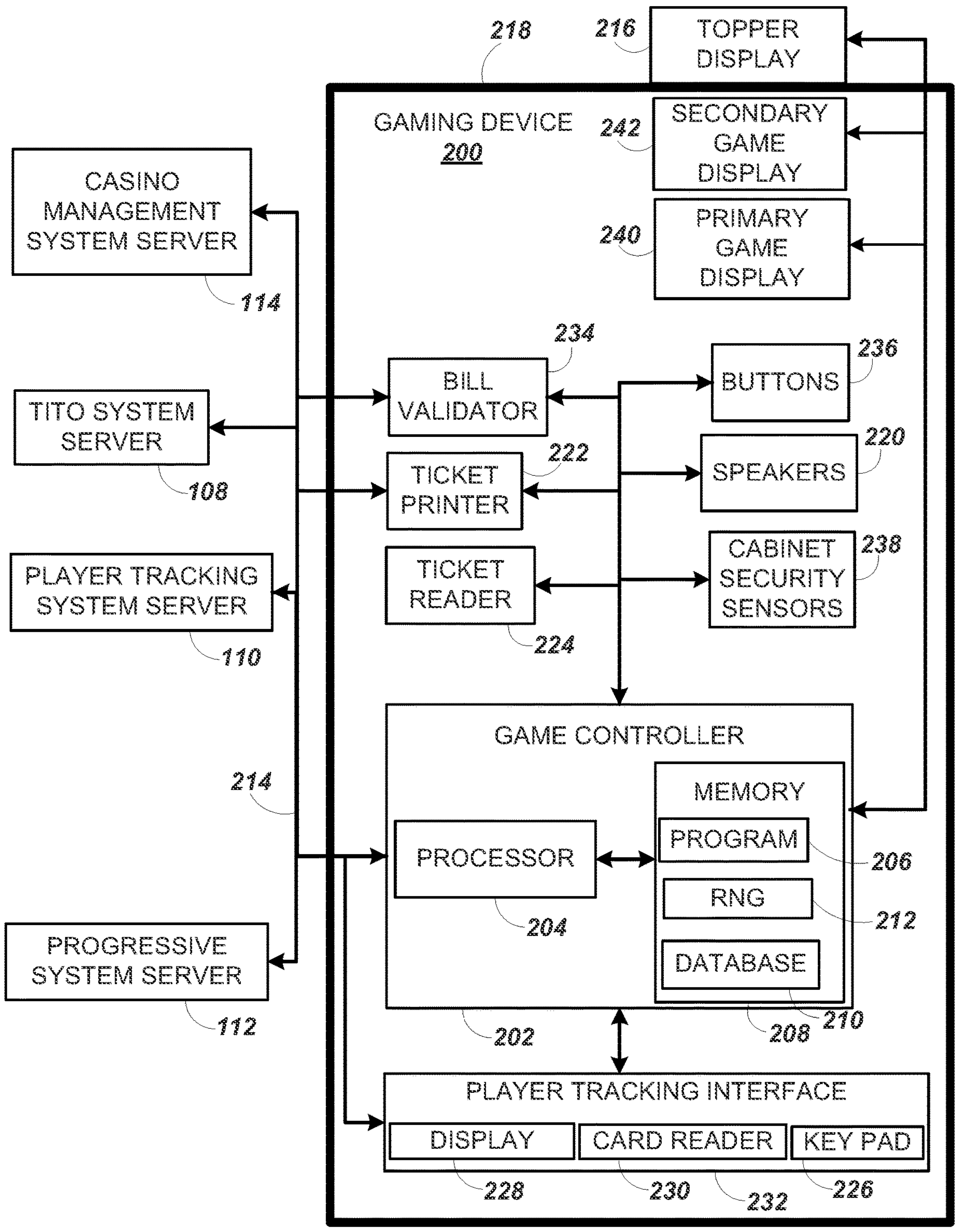
FIG. 2 is a block diagram showing various functional elements of an exemplary EGM.

Many or all the above-described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player-tracking interface 232 may include a keypad 226 for entering information, a player tracking display 228 for displaying information (e.g., an illuminated or video display), a card reader 230 for receiving data and/or communicating information to and from media or a device such as a smart phone-enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player-tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general-purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
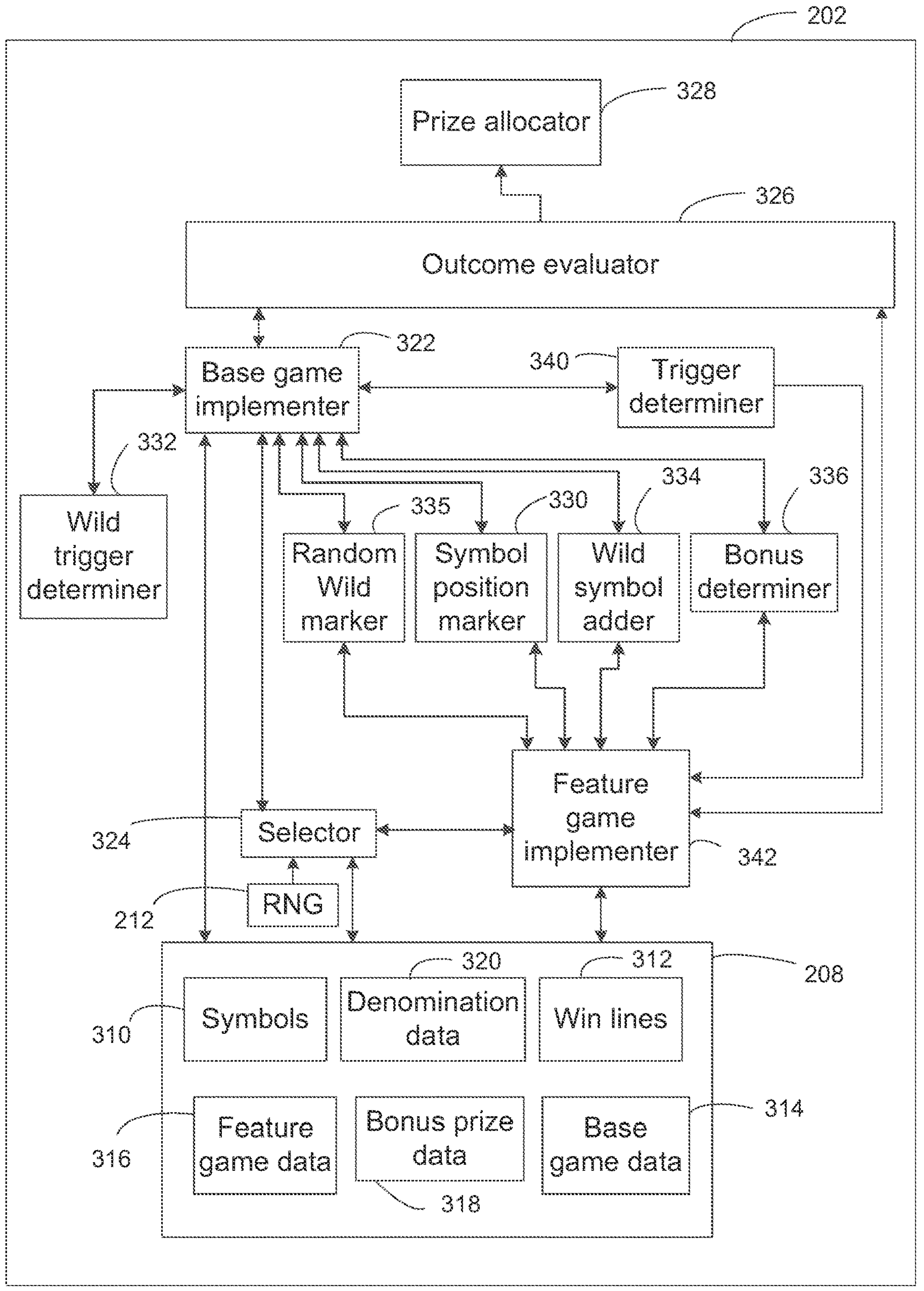
FIG. 3 is a block diagram showing functional components implemented by a game controller.

FIG. 3 illustrates a block diagram showing functional components implemented by the game controller 202. In this example, the functional components comprise data stored in the memory 208, including data indicative of symbols 310; data indicative of win lines 312; base game data 314 defining characteristics of a base game; feature game data 316 defining characteristics of a feature game; and bonus prize data 318 indicative of an applicable bonus prize. The memory 208 also includes denomination data 320 indicative of available denomination amounts.

The functional components also include a base game implementer 322 arranged to implement base games using a selector 324 to select, with the random number generator 212, symbols from the symbols data 310 for display at a plurality of symbol positions in a symbol array. Outcomes of a base game are determined by an outcome evaluator 326 and any applicable prize is awarded by a prize allocator 328, for example based on a base game pay table.

In this example, the functional components also include a symbol position marker 330 arranged to add a persistent wild marker to a display position of the display area when a special symbol is selected and displayed at the display position. The wild marker serves to indicate to the player that a wild symbol will be added to the display position when a trigger condition is determined to exist. In this example, the wild markers can persist for multiple base games and a wild symbol is added to the display position when a wild trigger condition is determined to exist or a feature trigger condition is determined to exist. In this way, the number of wild markers, and therefore potential wild symbols, can progressively increase as more base games are played until the defined wild trigger or feature trigger condition occurs.

In this example, the persistent wild marker is a frame, that may be animated for example so as to provide the appearance of a fire frame, extending around at least part of a symbol displayed at the display position, although it will be understood that any suitable indicia or graphical indicator may be used to provide an indication to the player that the display position is marked.

The functional components also include a wild trigger determiner 332 arranged to determine whether a wild trigger condition exists, and to cause a wild symbol adder 334 to add a wild symbol to each display position that is marked with a persistent wild marker. The wild trigger determiner 332 causes a wild trigger to occur in a base game, and in this example, the likelihood of a wild trigger is randomly determined and is also based on the number of successive spins.

In this example, the likelihood of a wild trigger occurring generally increases as the number of successive base games played increases. For example, as shown by weighting table 2500 in FIG. 25, the likelihood of a wild trigger occurring is highest between 12 to 19 spins and above 27 spins.

The functional components also include a random wild marker 335 arranged to determine, after a wild trigger has occurred, whether to add one or more further persistent wild markers to the display area, and therefore more wild symbols to the display positions. In this example, the random wild marker 335 uses the random number generator 212 and a weighting table 2600 as shown in FIG. 26. Further random wild markers may be added during a base game or a feature game and, as shown in the weighting table 2600, the likelihood of adding at least one further random wild marker is the same during both the base games and the feature games, although it will be understood that other implementations are envisaged.

In this example, the random wild marker 335 also determines how many further persistent wild markers to add to the display area, in this example using the random number generator 212 and a weighting table 2700 as shown in FIGS. 27A to 27E. As shown, the number of persistent wild markers to add depends at least partly on the number of persistent wild markers that are already present on the display area. For example, as shown in FIG. 27A, if 3 persistent wild markers are currently present in the display area, then the most likely numbers of added persistent wild markers are 3, 4, 5, or 6, since the weightings for these are 16/100, 12/100, 13/100 and 15/100, respectively.

After evaluation of the outcome defined by the symbols displayed in the display area, inclusive of the added wild symbols, all persistent wild markers are removed. Before commencement of a subsequent base game, at least one, in this example between 1 and 5, persistent wild markers are randomly added to the display area, for example using the random number generator 212 and a weighting table, such as the reset wild marker weighting table 2800 shown in FIG. 28. In this way, the gaming system ensures that at least one persistent wild marker is always present during a base game.

The functional components also include a bonus determiner 336 arranged to determine whether a bonus condition exists, in this example during a base game or feature game, and to cause the prize allocator 328 to award a prize to a player when the bonus condition occurs. In this example, the bonus condition occurs when all display positions in the display area include a persistent wild marker, and the bonus amount is a defined credit amount that may vary, for example based on game play, although it will be understood that other implementations are envisaged.

The functional components also include a feature trigger determiner 340 arranged to make a determination based on an event during a base game as to whether to commence a feature that includes at least one free game, such as 5 free games. The event for example may be based on whether a trigger condition has occurred during the base game such as selection and display of a defined number of trigger symbols during the base game. In an example, selection and display of at least three "scatter" symbols constitutes a trigger condition, although it will be understood that any suitable trigger condition is envisaged.

The functional components also include a feature game implementer 342 arranged to implement a feature after a trigger condition has occurred during a base game.

In this example, the feature game implementer 342 is also arranged to add further free games, for example 5 free games, if a trigger condition occurs during a feature game. The trigger condition in the feature game may be the same as the trigger condition during the base game, that is, selection and display of at least 3 "scatter" symbols.

The persistent wild markers added to the display area during the base games are retained for the feature games. During each feature game, a wild symbol is added to each display position that includes a persistent wild marker and the outcome of the feature game is then determined based on the displayed symbols inclusive of the added wild symbols. In a similar way to the base games, further persistent wild markers and therefore further wild symbols may be randomly added during each feature game, and a bonus prize may be awarded if all display positions of the display area include a persistent wild marker.

After completion of the feature games, all persistent wild markers are removed. Before commencement of a subsequent base game, at least one, in this example between 1 and 5, persistent wild markers are randomly added to the display area, for example using the random number generator 212 and a weighting table, such as the reset wild marker weighting table 28 as shown in FIG. 28. In this way, the gaming system ensures that at least one persistent wild marker is always present in a base game.

Outcomes of a feature game are in this example also determined by the outcome evaluator 326 and any applicable prize is awarded by the prize allocator 328.

FIG. 4 illustrates an example of a set 400 of five reel strips 421, 422, 423, 424, 425. In the example, each reel strip is associated with 12 different symbol types and a "stack" symbol type that corresponds to one of the 12 symbol types by selecting one of the 12 symbol types before implementation of a base game. For example, using the random number generator 212 and stack symbols weighting table 2400, such as shown in FIG. 24, the gaming system randomly selects one of the 12 symbol types and replaces the "stack" symbol on each reel with the selected symbol. In this example, the Pic2 symbol type has been selected, and, accordingly, all "stack" symbols on the reels are replaced with Pic2 symbols prior to implementation of a base game.

Each reel strip has multiple reel strip positions and each reel strip position is associated with a symbol selected from one of the 12 symbol types. The number of each type of symbol on each reel varies, and in this example, the number of each type of symbol on each reel is shown in FIG. 4. In this example, reel 1 has a total of 145 symbols, including two special (Dragon) symbols, seven Pic1 symbols, and so on.

However, it will be understood that other reels strips to those illustrated in FIG. 4 can be used. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 5:
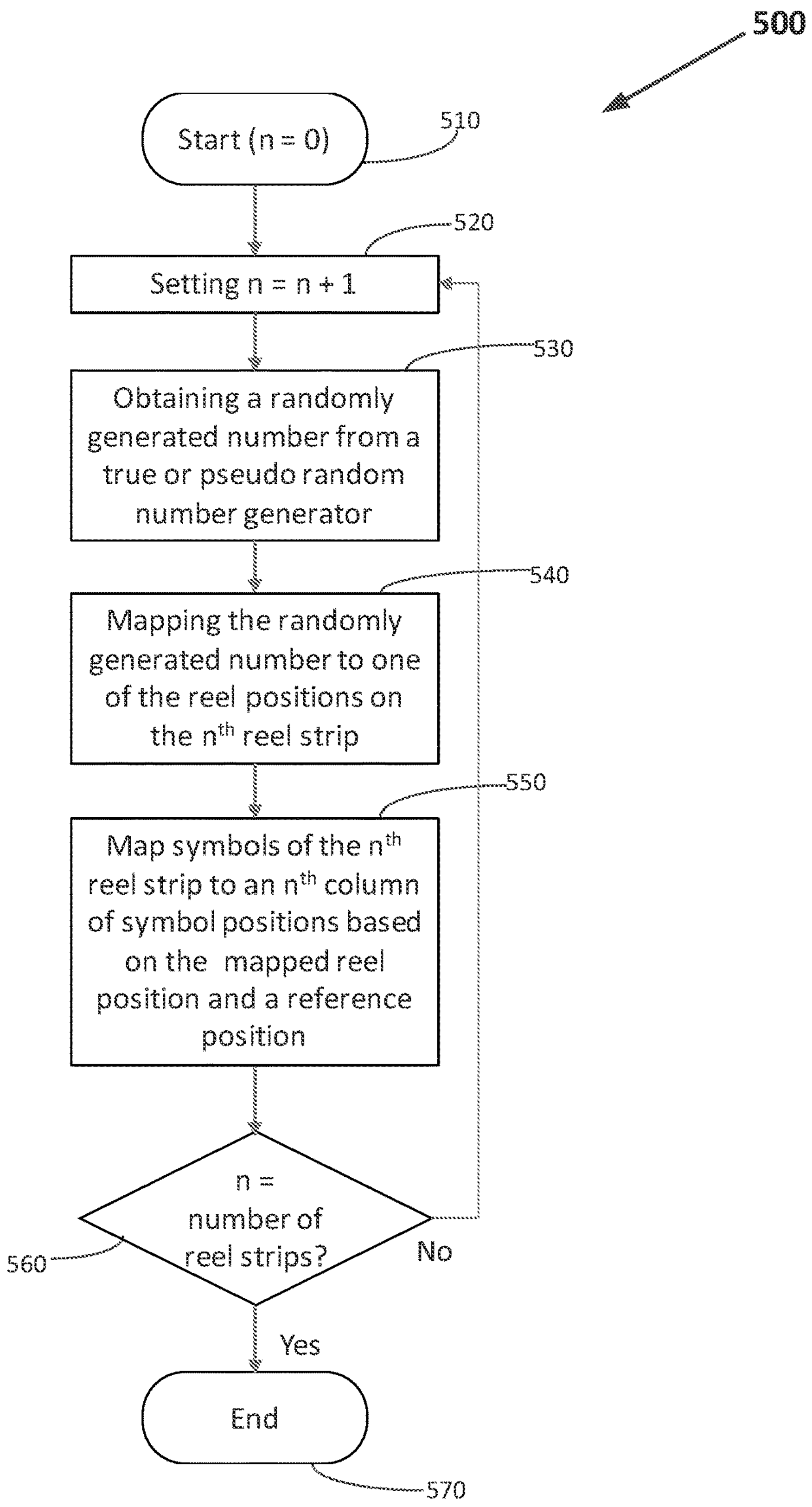
FIG. 5 is a flow chart of an example symbol selection method.

FIG. 5 is a flow chart of a method 500 carried out by the processor 204 to select symbols from reel strips. At step 510, the processor 204 starts the process of selecting symbols with a counter (n) set at zero as symbols have not yet been selected from any reel strips. At step 520, the processor 204 increments the counter. In the first iteration, the counter is set to 1 to reflect that symbols are to be selected from a first reel strip. At step 530, the processor obtains a randomly generated number from a true or pseudo random number generator 212. At step 540 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 550, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column.

At step 560, the processor 560 determines whether symbols have been selected for all of the reel strips, and if not the processor reverts to step 520 and iterates through steps 530, 540 and 550 until it is determined at step 560 that symbols have been selected from all n reel strips and mapped to all n columns of symbol positions after which the symbol selection process ends 570. Different numbers of symbols may be mapped to different numbers of symbol positions.

After the symbols of all reel strips have been mapped to symbol positions, the processor 204 controls display 240 to display them at the symbol positions.

An example implementation will now be described in relation to flow diagrams shown in FIGS. 6 and 7, screens displayed to a player on an example gaming machine, as shown in FIGS. 8 to 23, and weighting tables shown in FIGS. 24 to 28.

Figure 6:
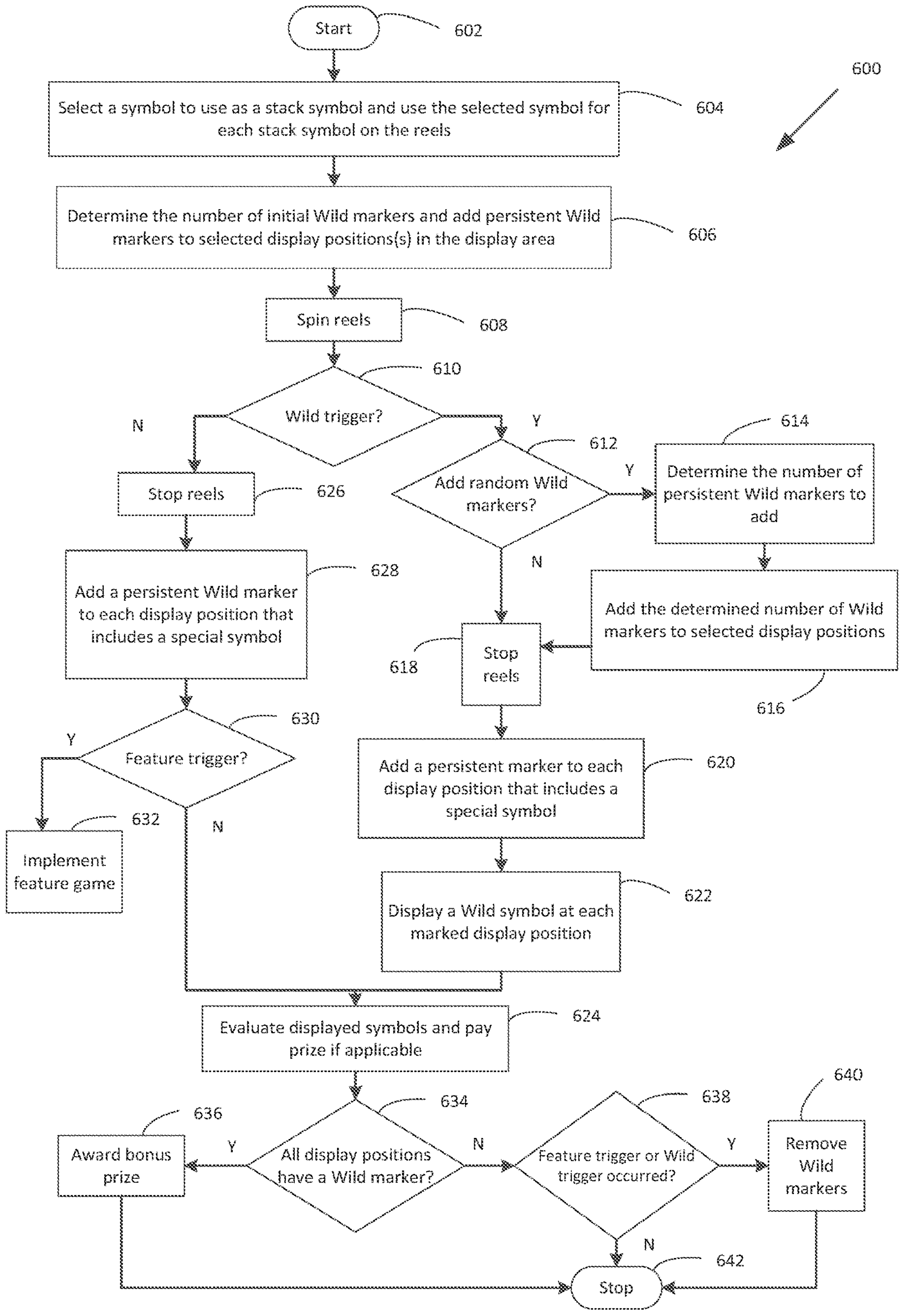
FIG. 6 is a flow chart illustrating an example base game play process of an example method of gaming.
Figure 7:
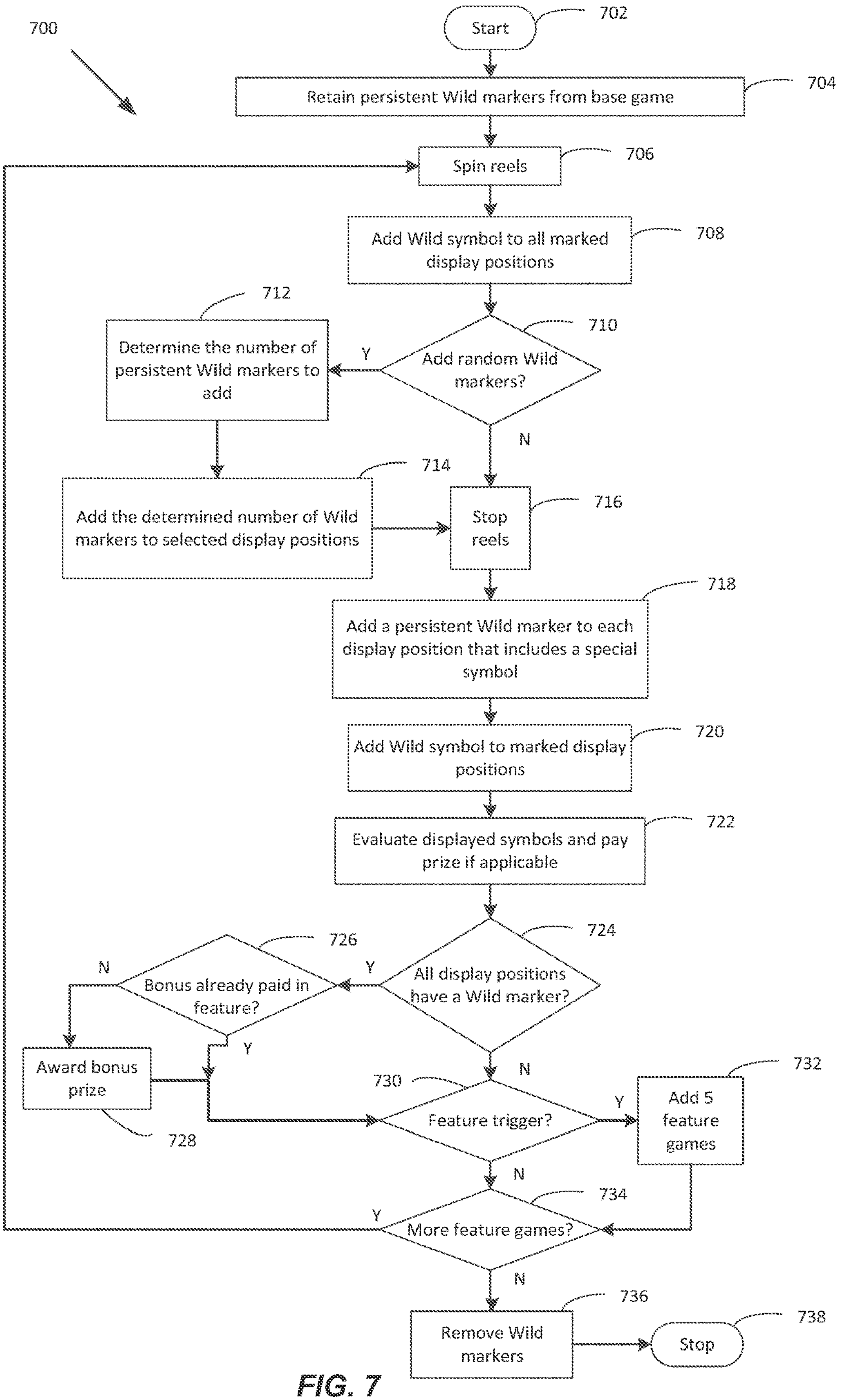
FIG. 7 is a flow chart illustrating an example feature game play process of an example method of gaming.

A flow chart 600 illustrating an example process for implementing a base game is shown in FIG. 6.

Prior to implementation of a base game, a player first selects a denomination that will be used for bets during the base games.

Representations 800, 900, 1000, 1100, 1200, 1300, 1400, 1500 and 1600 of screens displayed to a player on a gaming machine during implementation of a base game are shown in FIGS. 8 to 16.

As shown in FIGS. 8 to 23, the gaming machine includes a game screen 806 on which a symbol array 802 is displayed in a symbol display area 804, the symbol array 802 including selected symbols that may include standard symbols 808 and picture symbols 810.

Prior to implementation of a base game, as indicated at step 604, the gaming machine selects one of the picture symbols 810 to use as a stack symbol 811, for example using the random number generator 212 and stack symbol weighting table 2400 as shown in FIG. 24, and the selected picture symbol is then used for all stack symbols 811 on the reels 421, 422, 423, 424, 425. In this example, a "Pic2" picture symbol 811 is selected and used as all stack symbols 811 on the reels.

The gaming machine then selects at least one, in this example between 1 and 5, display positions of the symbol array 802 to receive a wild marker 812, and adds the wild marker(s) 812 to the relevant display positions, as indicated at step 606. In this example, the number of wild markers added to the symbol array 802 is determined using reset wild marker weighting table 2800 as shown in FIG. 28.

Figure 8:
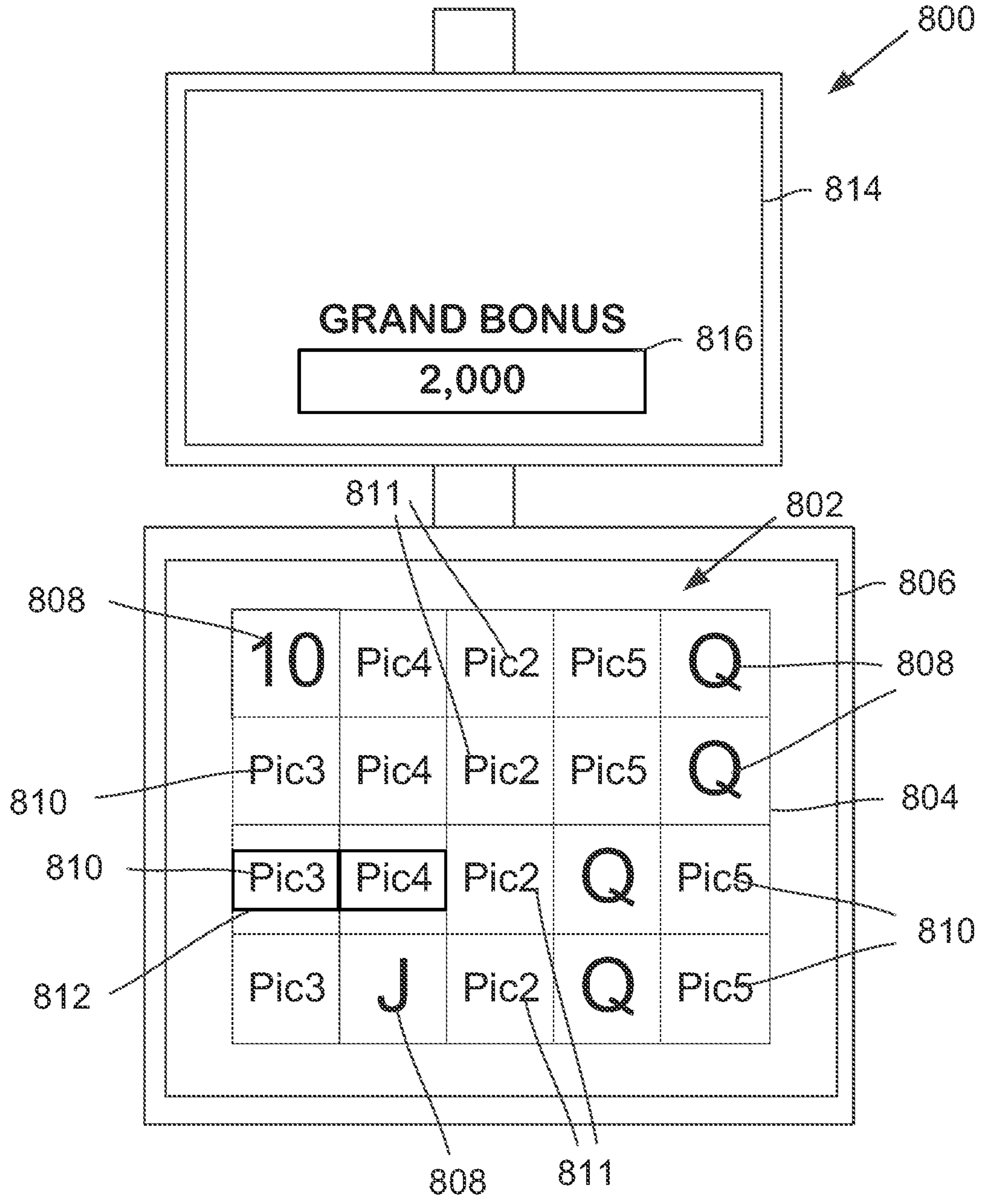
FIG. 8 is an example representation of screens of an EGM at commencement of implementation of a base game.

The selector 324, under the control of the base game implementer 322, selects several symbols 310 using the random number generator 212, and the selected symbols are displayed in the symbol array 802, as indicated at step 608 and shown for example in FIG. 8.

If a wild trigger occurs during the base game, a determination is made as the reels are spinning as to whether to randomly add at least one further wild marker, and if a decision is made to randomly add at least one wild marker, at least one wild marker is added to the symbol array 802, as indicated at steps 612 to 616. In this example, the determination as to whether to randomly add at least one wild marker is made using random wild marker weighting table 2600 shown in FIG. 26, and the number of wild markers to add is determined using wild marker number weighting tables 2700 shown in FIGS. 27A to 27E. After one or more random wild marker has been added or after a determination has been made that, no random wild markers will be added, the reels are caused to stop, as indicated at step 618.

After the reels have stopped spinning, the symbol position marker 330 adds a wild marker 812 to each display position that includes a special symbol, in this example, a Dragon symbol, as indicated at step 620, then the wild symbol adder 334 adds a wild symbol to each display position that includes a wild marker 812.

The outcome evaluator 326 then evaluates the outcome defined by the symbols displayed in the symbol array 802, including the displayed wild symbols, and a prize is awarded if applicable, as indicated at step 624.

If a wild trigger does not occur during the base game, the reels are caused to stop spinning, as indicated at step 626, and the symbol position marker 330 adds a wild marker 812 to each display position that includes a special symbol, in this example a Dragon symbol, as indicated at step 628.

As indicated at steps 630 and 632, if a wild trigger has not occurred during a base game but a feature trigger occurs during the base game, a feature is implemented that in this example includes several free feature games. A flow chart 700 illustrating an example process for implementing a feature is shown in FIG. 7.

If neither a wild trigger nor a feature trigger occurs during the base game, the outcome evaluator 326 evaluates the outcome defined by the symbols displayed in the symbol array 802, and a prize is awarded if applicable, as indicated at step 624.

As indicated at steps 634 and 636, in this example if during a base game all display positions include a wild marker 812, a bonus prize is awarded.

After completion of the base game or feature, if applicable, if a wild trigger or a feature trigger has occurred during the recently completed base game, all wild markers 212 are removed before commencement of the next base game, as indicated at steps 638 and 640.

The wild markers 812 remain persistent in subsequent base games until a wild trigger or feature trigger occurs.

In this example, the gaming machine also includes a top screen 814 arranged to display bonus information 816, for example relating to the current applicable bonus amount.

The example feature process shown in FIG. 7 will now be described.

As indicated at step 704, after triggering the feature at step 632 all wild markers 812 present in the base game are retained and remain persistent for all feature games implemented during the feature. The reels are spun and the wild symbol adder 334 adds a wild symbol to each display position that includes a wild marker 812 whilst the reels are spinning.

A determination is also made as to whether to randomly add at least one further wild marker 812, and if a decision is made to randomly add at least one wild marker 812, at least one wild marker 812 is added to the symbol array 802, as indicated at steps 710 to 714. In this example, the determination as to whether to randomly add at least one wild marker 812 is made using random wild marker weighting table 2600 as shown in FIG. 26, and the number of wild markers to add is determined using wild marker number weighting tables 2700 shown in FIGS. 27A to 27E. After one or more random wild marker has been added or after a determination has been made that no random wild markers will be added, the reels are caused to stop spinning, as indicated at step 716.

After the reels have stopped spinning, the symbol position marker 330 adds a wild marker 812 to each display position that includes a special symbol, in this example a Dragon symbol, as indicated at step 718, then the wild symbol adder 334 adds a wild symbol to each display position that includes a wild marker 812, as indicated at step 720.

The outcome evaluator 326 then evaluates the outcome defined by the symbols displayed in the symbol array 802, including the displayed wild symbols, and a prize is awarded if applicable, as indicated at step 722.

As indicated at steps 724 to 728, in this example, if during a feature game, all display positions include a wild marker 812 and a bonus prize has not already been awarded during any of the feature games in the feature, a bonus prize is awarded.

If a feature trigger occurs during a feature game, in this example selection and display of at least 3 'scatter' symbols, a defined number of additional feature games are added to the feature, such as 5 additional feature games, as indicated at steps 730 and 732.

After all available feature games have been implemented, all wild markers 812 are removed before commencement of the next base game, as indicated at steps 734 and 736.

A specific example implementation will now be described in relation to FIGS. 8 to 22 that show representations of screens displayed to a player on a gaming machine during a base game and a feature game.

FIG. 8 shows a representation 800 of a screen displayed to a player at commencement of a first base game after a wild trigger or feature trigger has occurred in a previously completed base game or a feature trigger has occurred in a previous base game and the feature games have been completed.

In order that at least one display position includes a wild marker 812, the gaming machine selects at least one display position to receive a wild marker, and in this example, two wild markers have been selected using the random number generator 212 and reset wild marker weighting table 2800 shown in FIG. 28.

In this example, a wild trigger or feature trigger does not occur in the first feature game, and therefore a wild symbol is not added to any of the marked symbol positions.

The outcome defined by the displayed symbols is evaluated and a prize awarded if applicable.

The wild markers 812 remain for subsequent base games until a wild trigger or feature trigger occurs.

Figure 9:
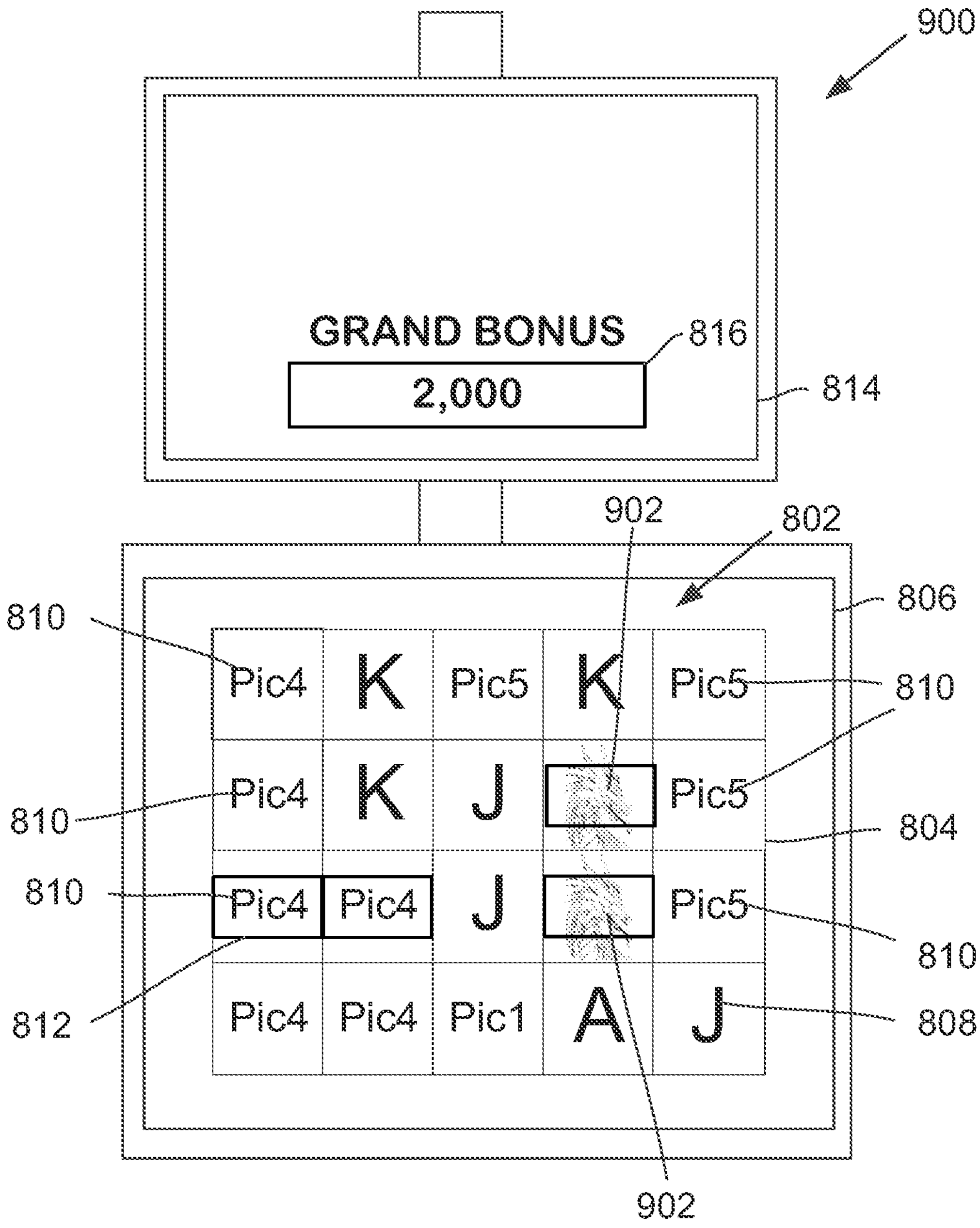
FIGS. 9, 10, 11, 12, 13, and 14 are example representations of screens of an EGM during implementation of a base game when a persistent wild marker is added.

FIG. 9 shows a representation 900 of a screen displayed to a player during a second base game.

As shown in FIG. 9, in the second base game, two Dragon symbols 902 are selected and displayed, and as a consequence, a wild marker 812 is added to each display position that includes the Dragon symbol 902. It will be understood, however, that no action occurs to a display position if a Dragon symbol is selected and displayed at the display position but a wild marker 812 is already present at the display position.

In this example, a wild trigger or feature trigger does not occur in the second feature game, and therefore a wild symbol is not added to any of the marked symbol positions.

The outcome defined by the displayed symbols is evaluated and a prize awarded if applicable.

Figure 10:
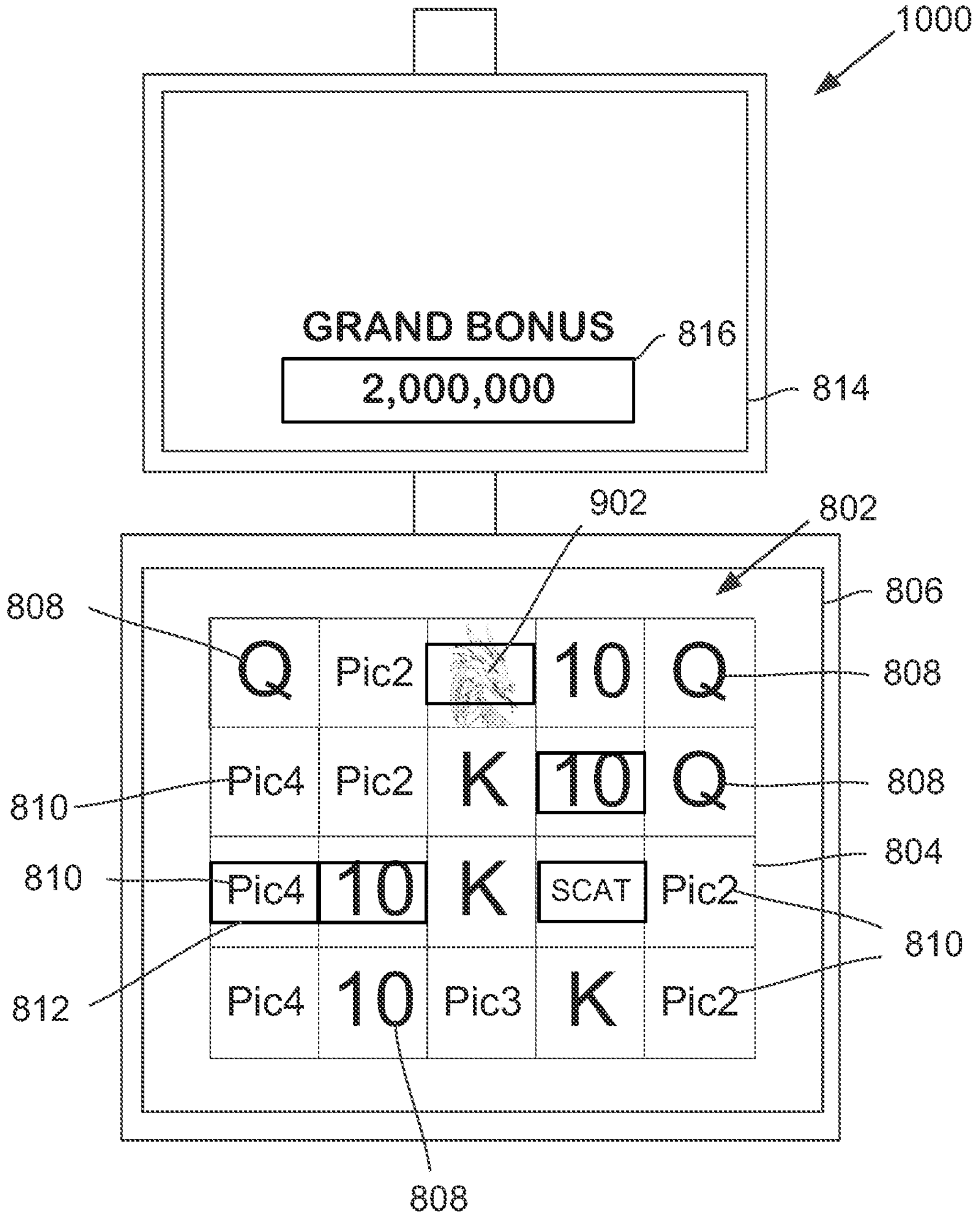

FIG. 10 shows a representation 1000 of a screen displayed to a player during a third base game.

As shown in FIG. 10, in the third base game, one Dragon symbol 902 is selected and displayed, and as a consequence, a wild marker 812 is added to the display position that includes the Dragon symbol 902.

In this example, a wild trigger or feature trigger does not occur in the third feature game, and therefore, a wild symbol is not added to any of the marked symbol positions.

The outcome defined by the displayed symbols is evaluated and a prize awarded if applicable.

Figure 11:
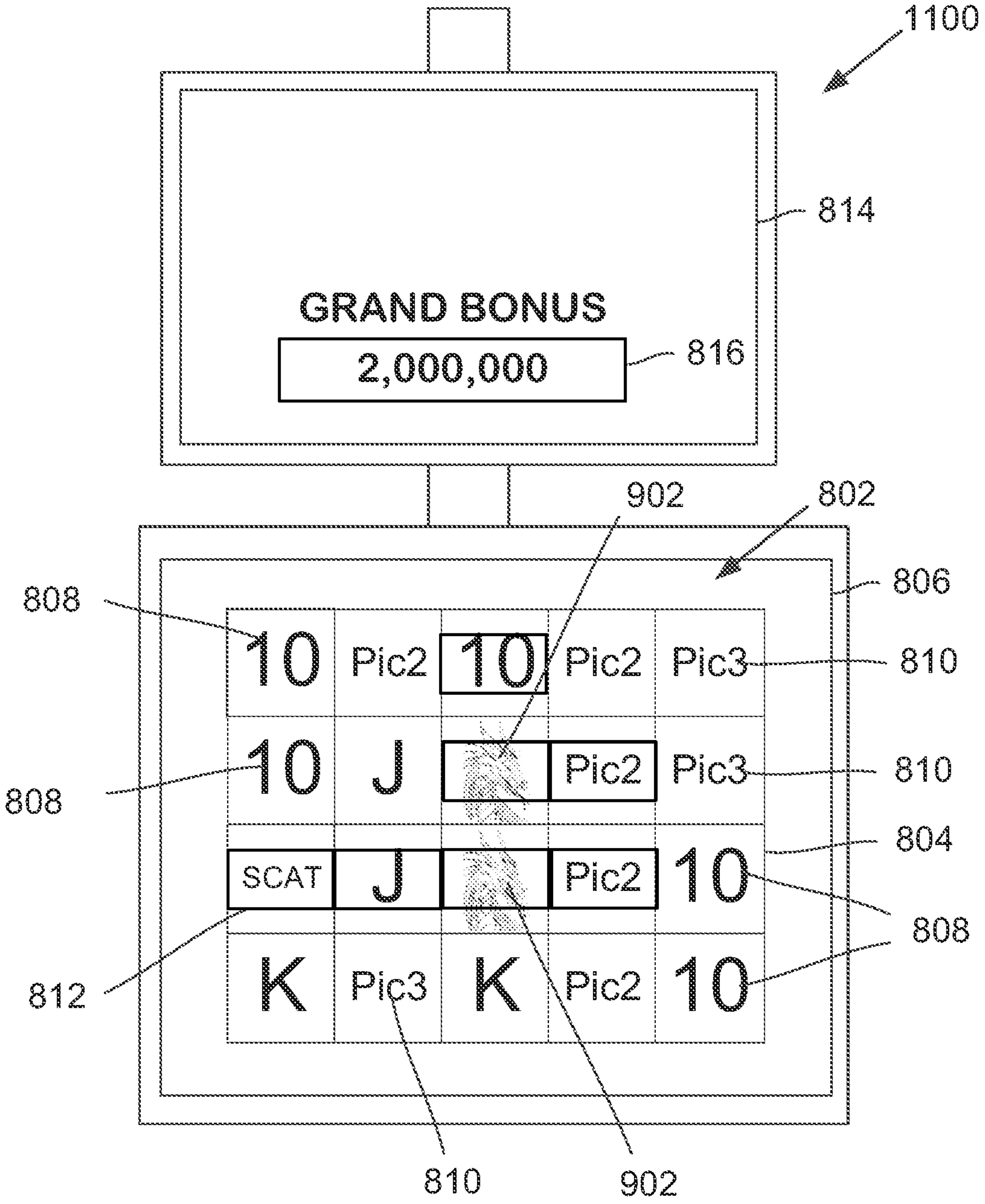

FIG. 11 shows a representation 1100 of a screen displayed to a player during a fourth base game.

As shown in FIG. 11, in the fourth base game, two Dragon symbols 902 are selected and displayed, and as a consequence, a wild marker 812 is added to each display position that includes the Dragon symbol 902.

In this example, a wild trigger or feature trigger does not occur in the fourth feature game, and therefore, a wild symbol is not added to any of the marked symbol positions.

The outcome defined by the displayed symbols is evaluated and a prize awarded if applicable.

Figure 12:
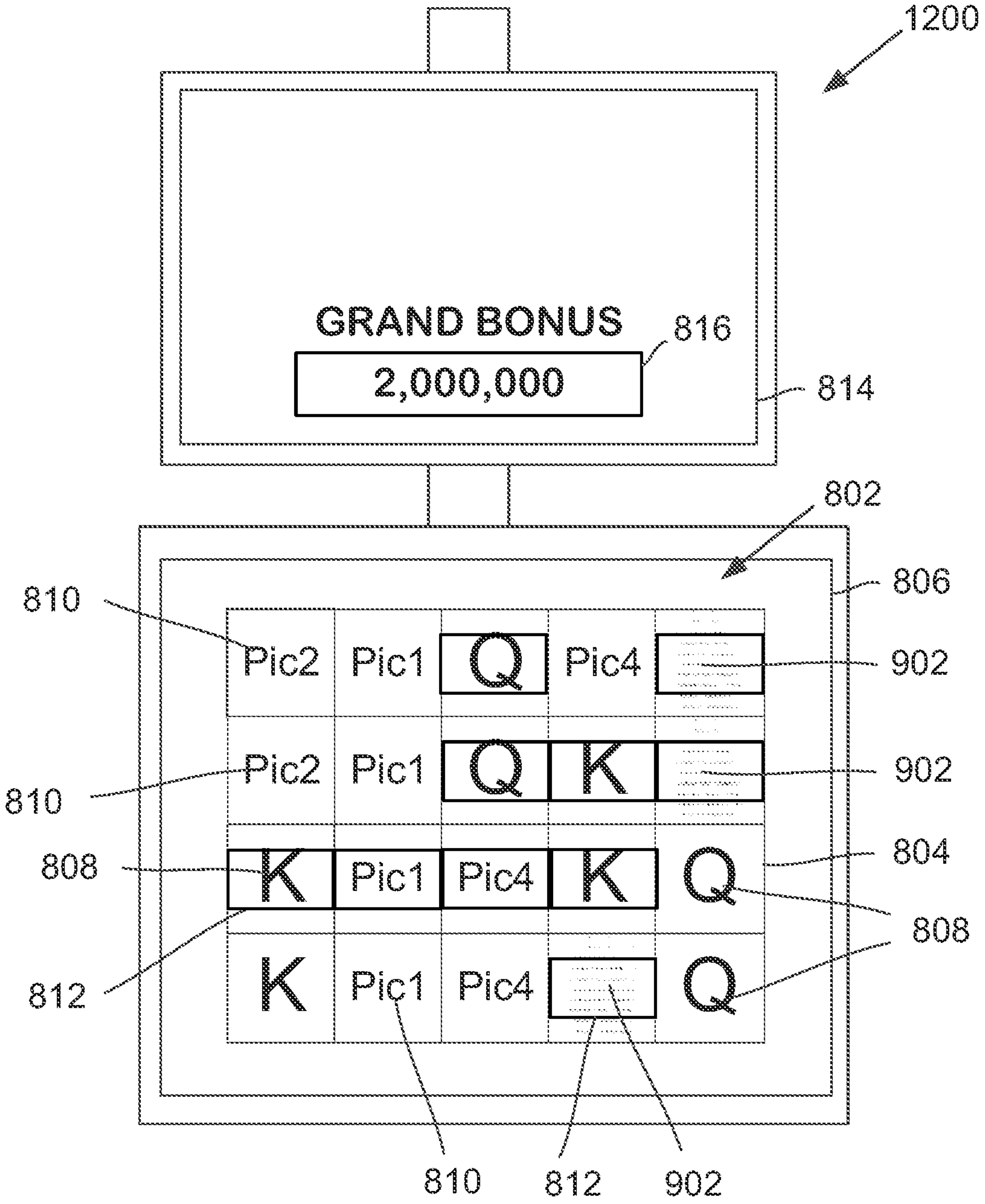

FIG. 12 shows a representation 1200 of a screen displayed to a player during a fifth base game.

As shown in FIG. 12, in the fifth base game, three Dragon symbols 902 are selected and displayed, and as a consequence, a wild marker 812 is added to each display position that includes the Dragon symbol 902.

In this example, a wild trigger or feature trigger does not occur in the fifth feature game, and therefore, a wild symbol is not added to any of the marked symbol positions.

The outcome defined by the displayed symbols is evaluated and a prize awarded if applicable.

Figure 13:
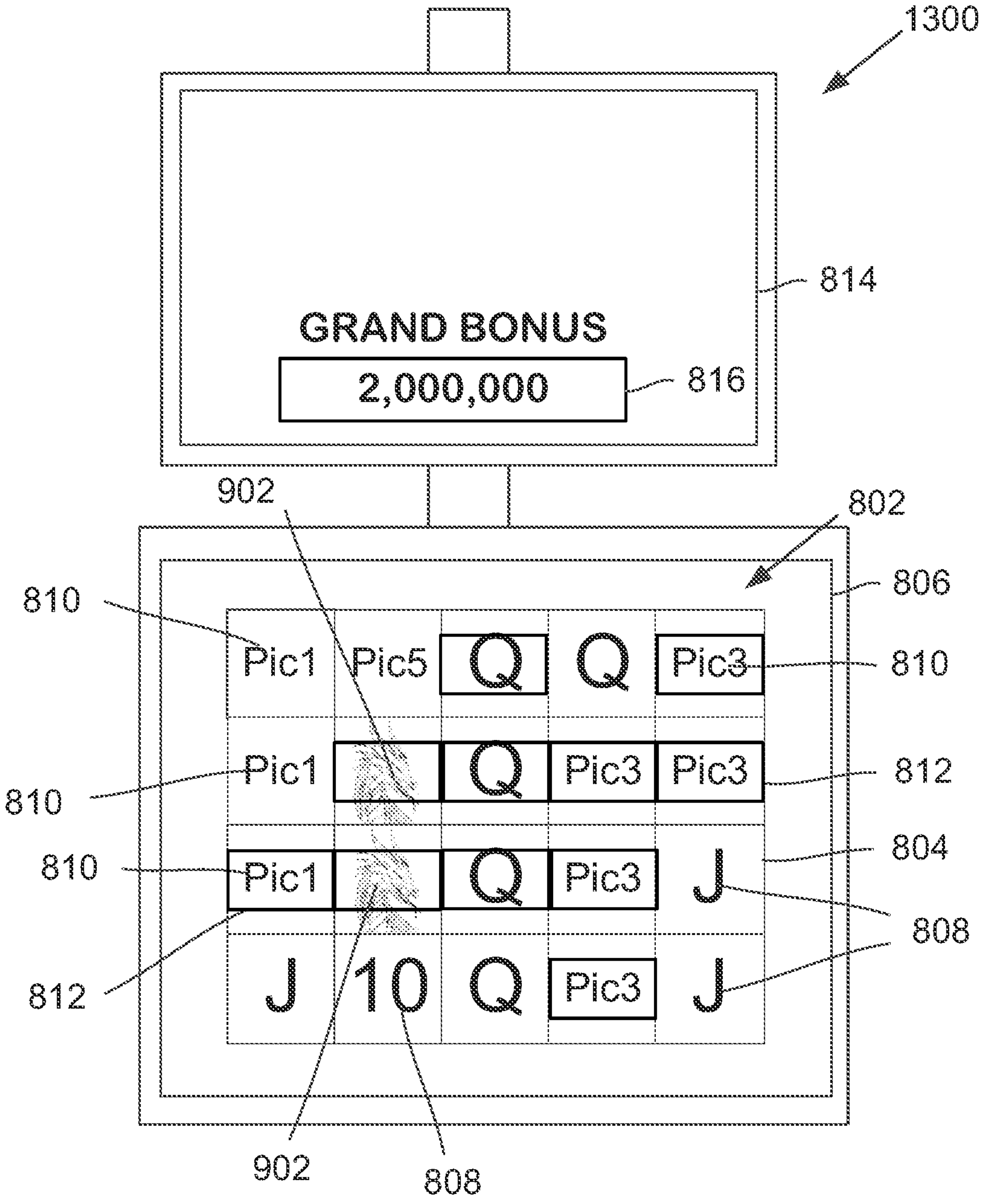

FIG. 13 shows a representation 1300 of a screen displayed to a player during a sixth base game.

As shown in FIG. 13, in the sixth base game, two Dragon symbols 902 are selected and displayed, but one of the Dragon symbols 902 is displayed at a symbol display position that already includes a wild marker from a previous base game. As a consequence, only one of the two Dragon symbols results in a new wild marker 812 added to the display positions.

In this example, a wild trigger or feature trigger does not occur in the sixth feature game, and therefore, a wild symbol is not added to any of the marked symbol positions.

The outcome defined by the displayed symbols is evaluated and a prize awarded if applicable.

Figure 14:
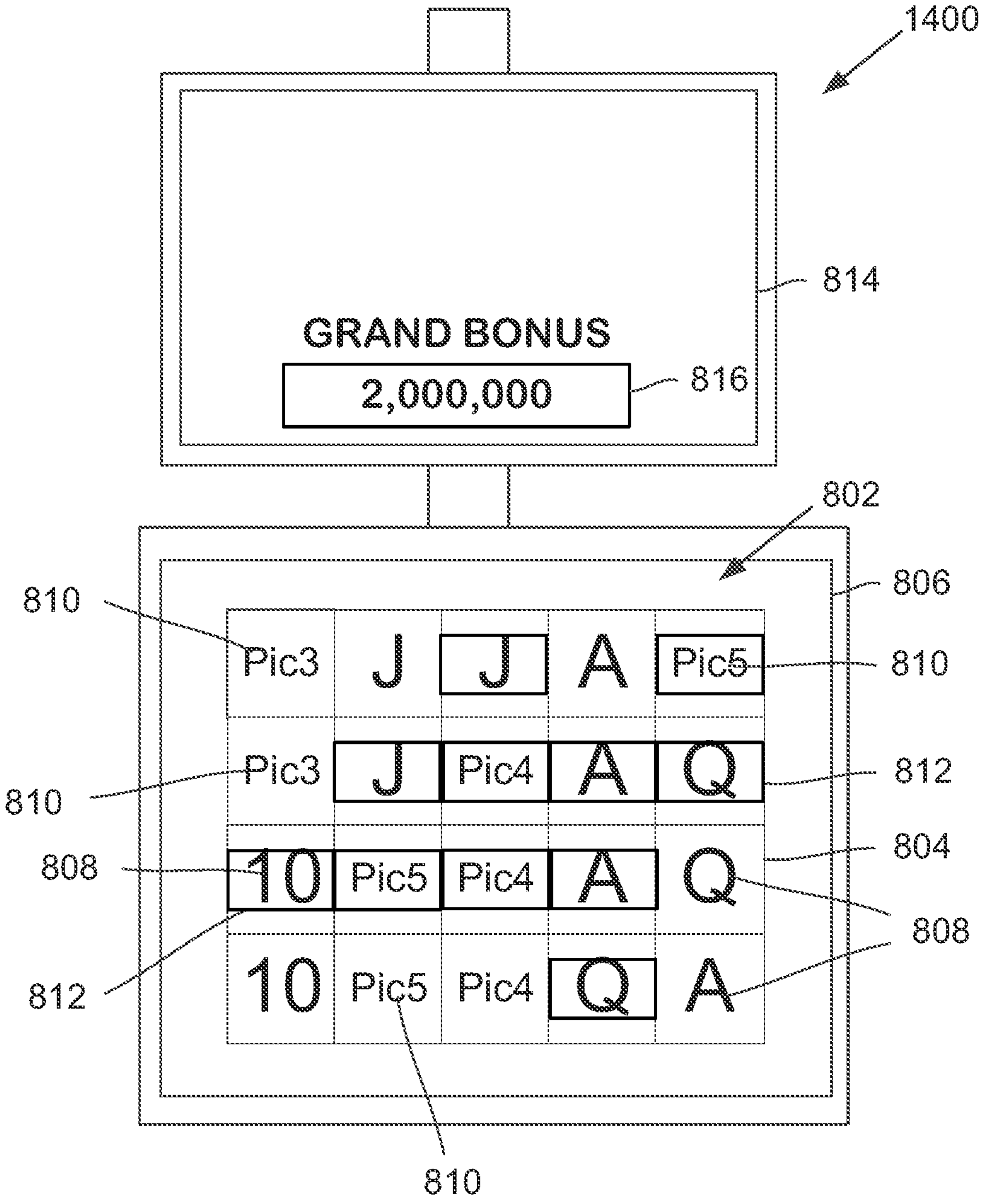

FIG. 14 shows a representation 1400 of a screen displayed to a player during a seventh base game.

As shown in FIG. 14, in the seventh base game, no Dragon symbols 902 are selected and displayed, and as a consequence, no wild markers 812 are added to the symbol array 802.

In this example, a wild trigger or feature trigger does not occur in the seventh feature game, and therefore a wild symbol is not added to any of the marked symbol positions.

The outcome defined by the displayed symbols is evaluated and a prize awarded if applicable.

Figure 15:
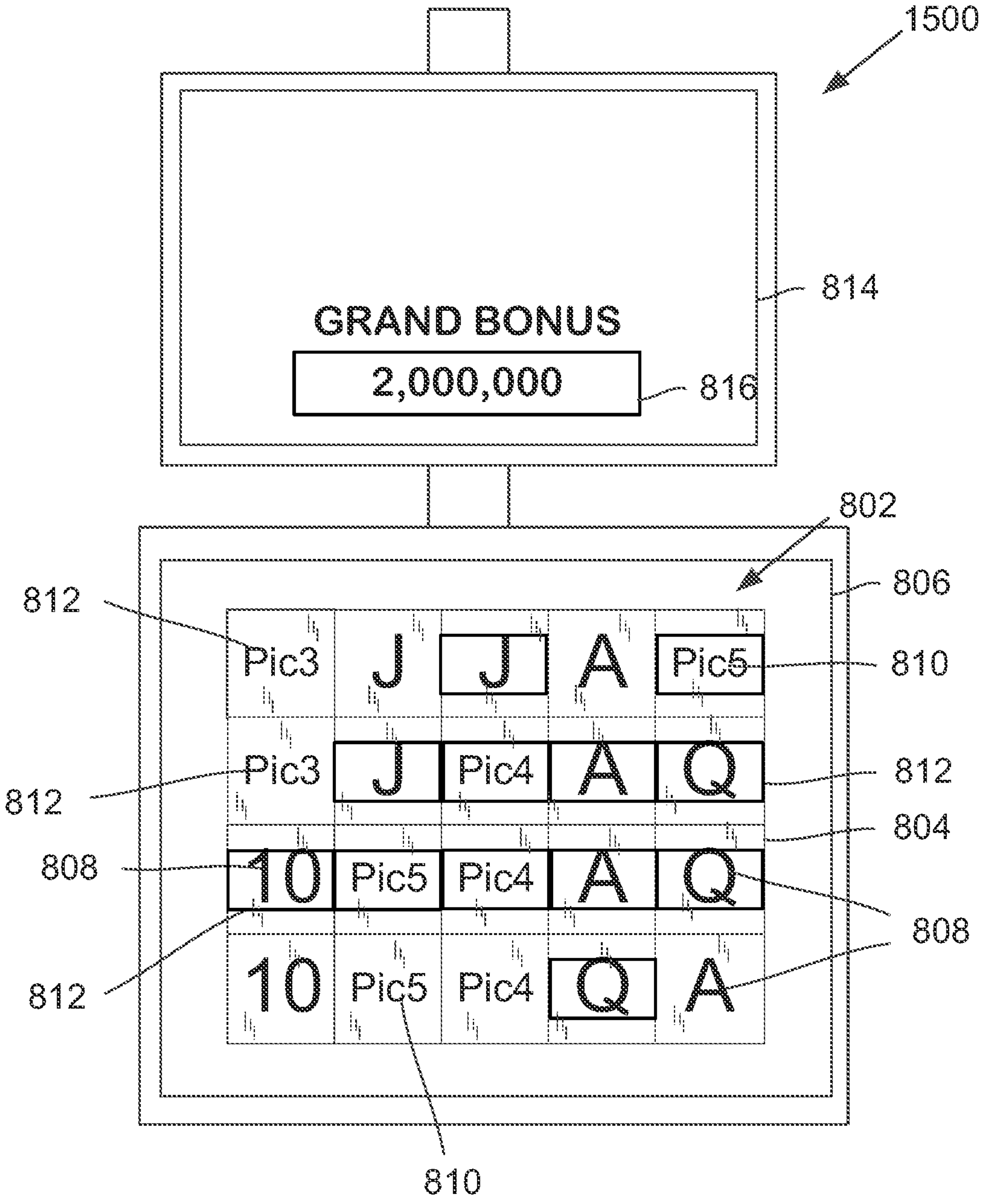
FIG. 15 is an example representation of screens of an EGM during implementation of a base game when a wild trigger condition exists and a wild symbol has been added to marked display positions.

FIG. 15 shows a representation 1500 of a screen displayed to a player during an eighth base game.

Figure 16:
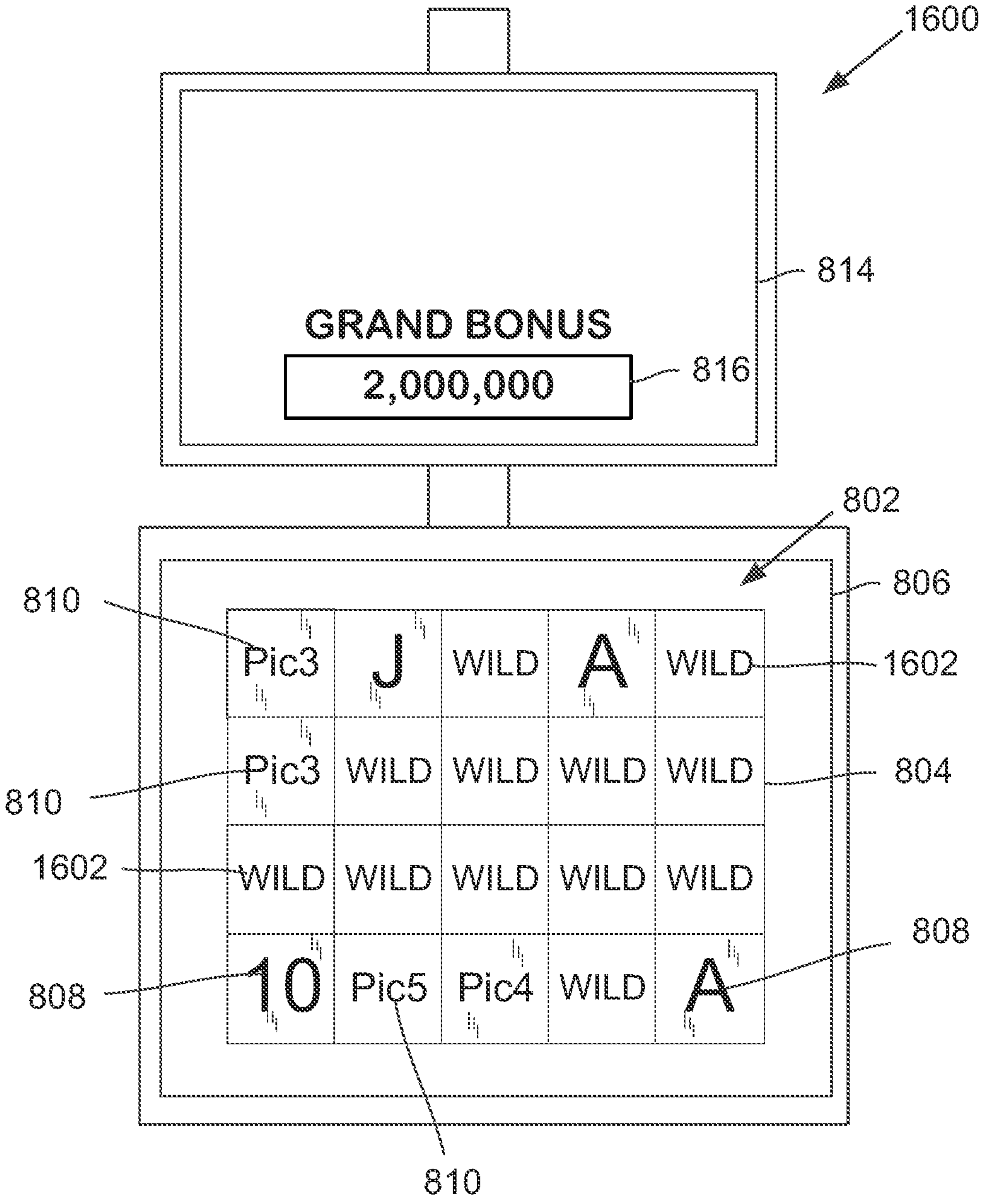
FIG. 16 is an example representation of screens of an EGM during implementation of a base game when a wild trigger condition does not exist and a feature trigger condition does not exist.

In the eighth base game, a wild trigger occurs. As the reels are spinning, a determination is made to add 1 further wild marker (in this example, fifth column from the left, third row from the top) to the symbol array 802. A wild symbol 1602 is then added to each display position that includes a wild marker 812, as shown in FIG. 16.

The wild trigger may also cause an animation sequence to occur that accompanies the action of adding a wild symbol to the marked display positions. For example, a representation of a dragon may be used that provides the player with the impression that the dragon is changing symbols disposed at the marked display positions to wild symbols. Similarly, adding a further wild marker may also cause a further, in this example, different animation sequence to occur that accompanies the action of adding the further wild symbol to the marked display positions. For example, a representation of a different dragon may be used that provides the player with the impression that the dragon is changing the symbol disposed at the further marked display positions to a wild symbol.

As no Dragon symbols are displayed after the reels have stopped spinning, no further wild markers are added.

The outcome defined by the displayed symbols is evaluated in consideration of the newly added wild symbols and a prize awarded if applicable.

Figure 17:
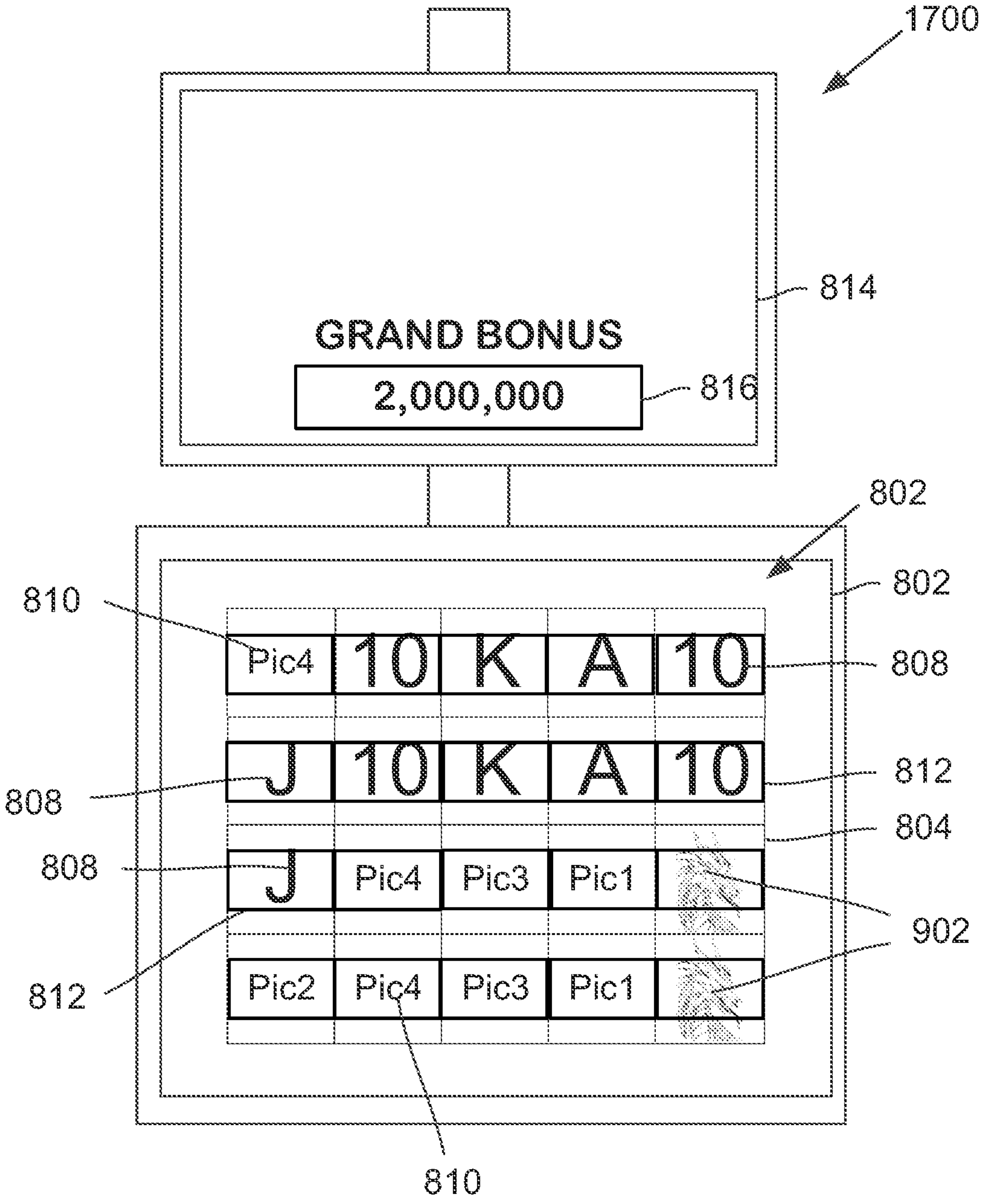
FIG. 17 is an example representation of screens of an EGM during implementation of a base game when all display positions include a wild marker.
Figure 18:
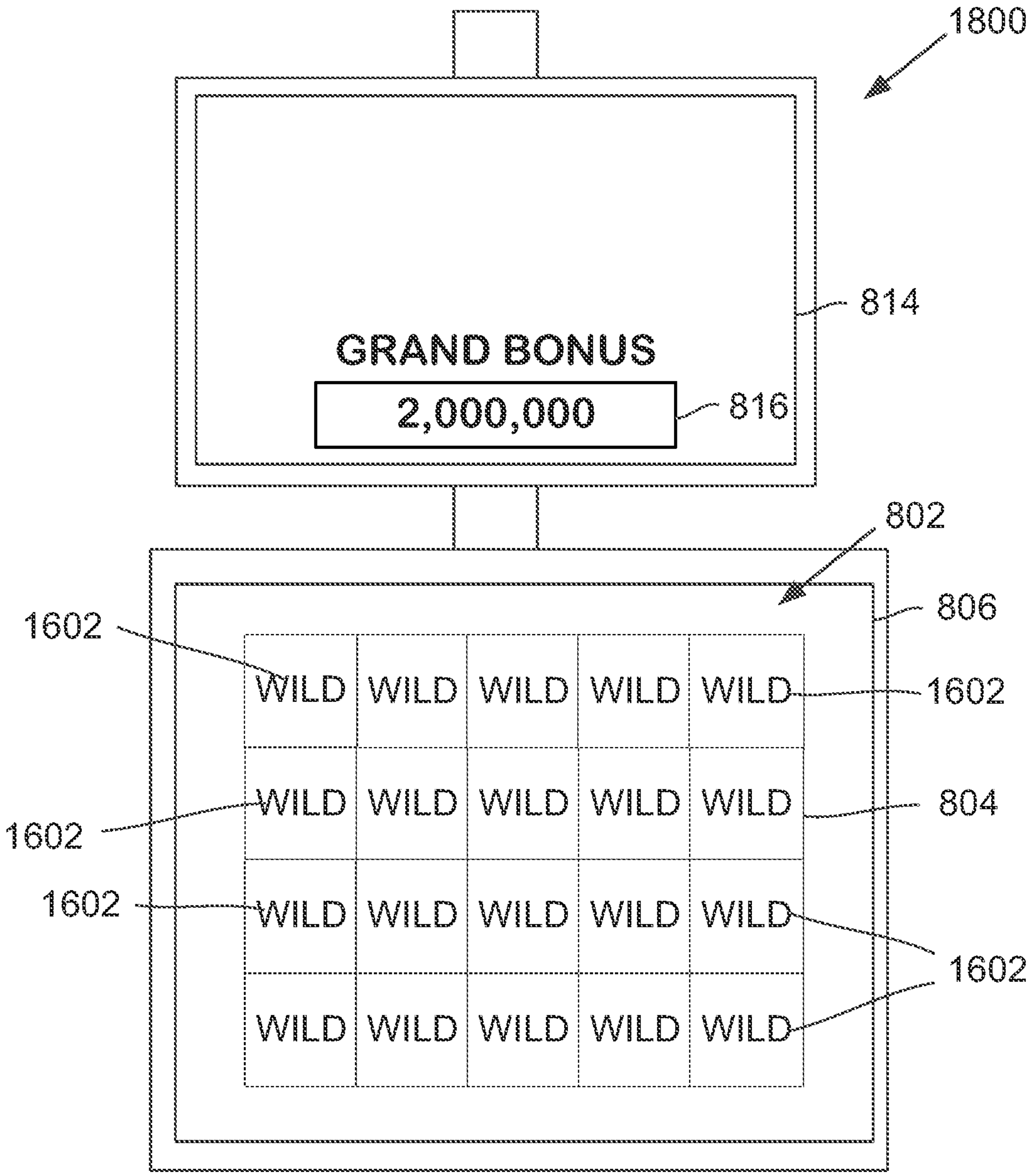
FIG. 18 is an example representation of screens of an EGM during implementation of a base game when all display positions include a wild symbol.

As shown in FIG. 17, in this example during a base game, if all display positions include a wild marker 812, a wild symbol 1602 is added to all display positions, as shown in FIG. 18, and a bonus prize 816, the amount of which is for example indicated on the top screen 814, is awarded.

Figure 19:
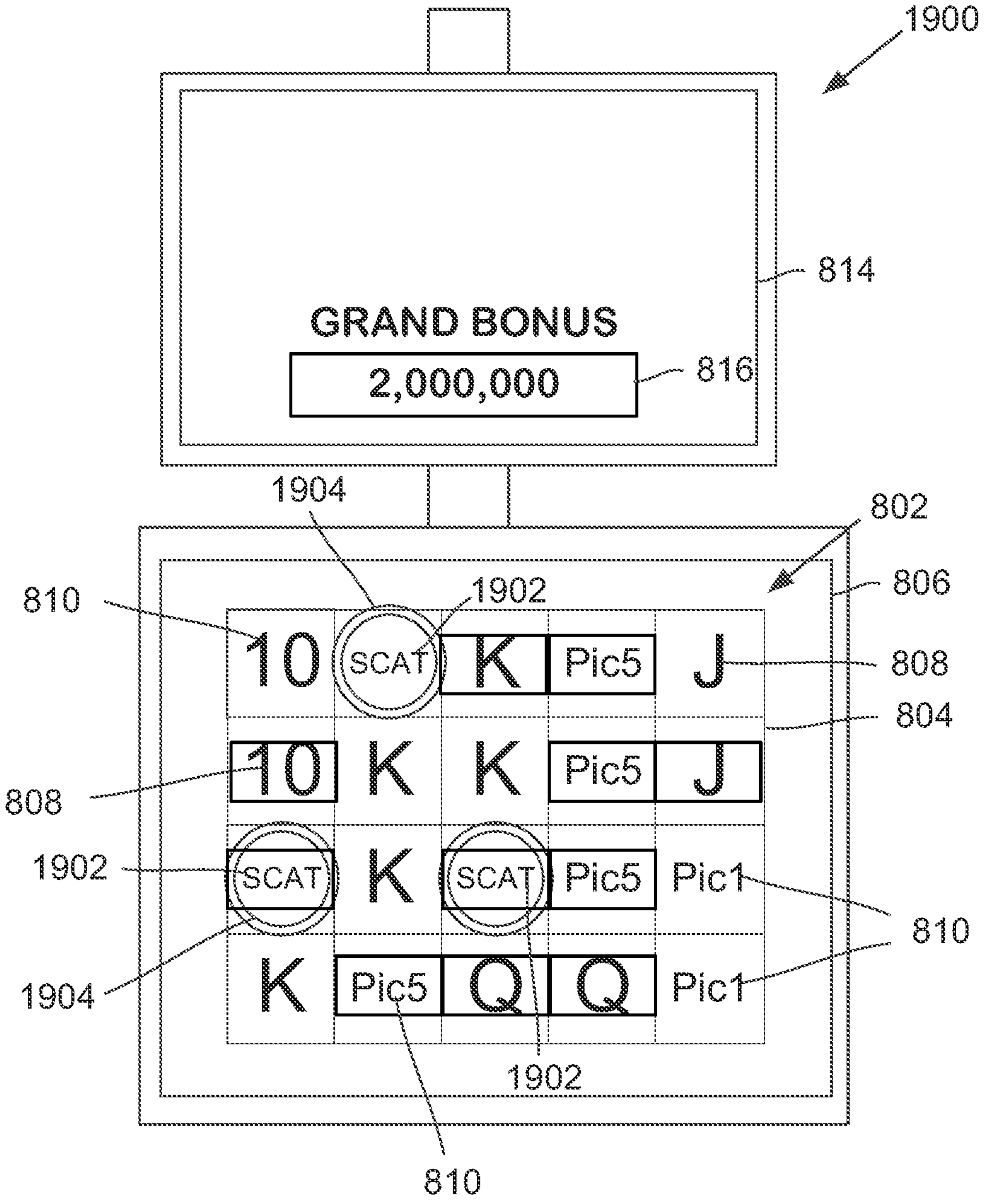
FIG. 19 is an example representation of screens of an EGM during implementation of a base game when a feature trigger condition occurs during the base game.

FIG. 19 shows a representation 1900 of a screen displayed to a player during a further example base game.

As shown in FIG. 19, if, during the further example base game, a feature trigger condition occurs, in this example, selection and display of at least 3 scatter symbols 1902, a feature is implemented that includes several free feature games. In this example, each scatter symbol of the trigger condition animates, for example by displaying an explosion animation 1904 in relation to each scatter symbol 1902.

Figure 20:
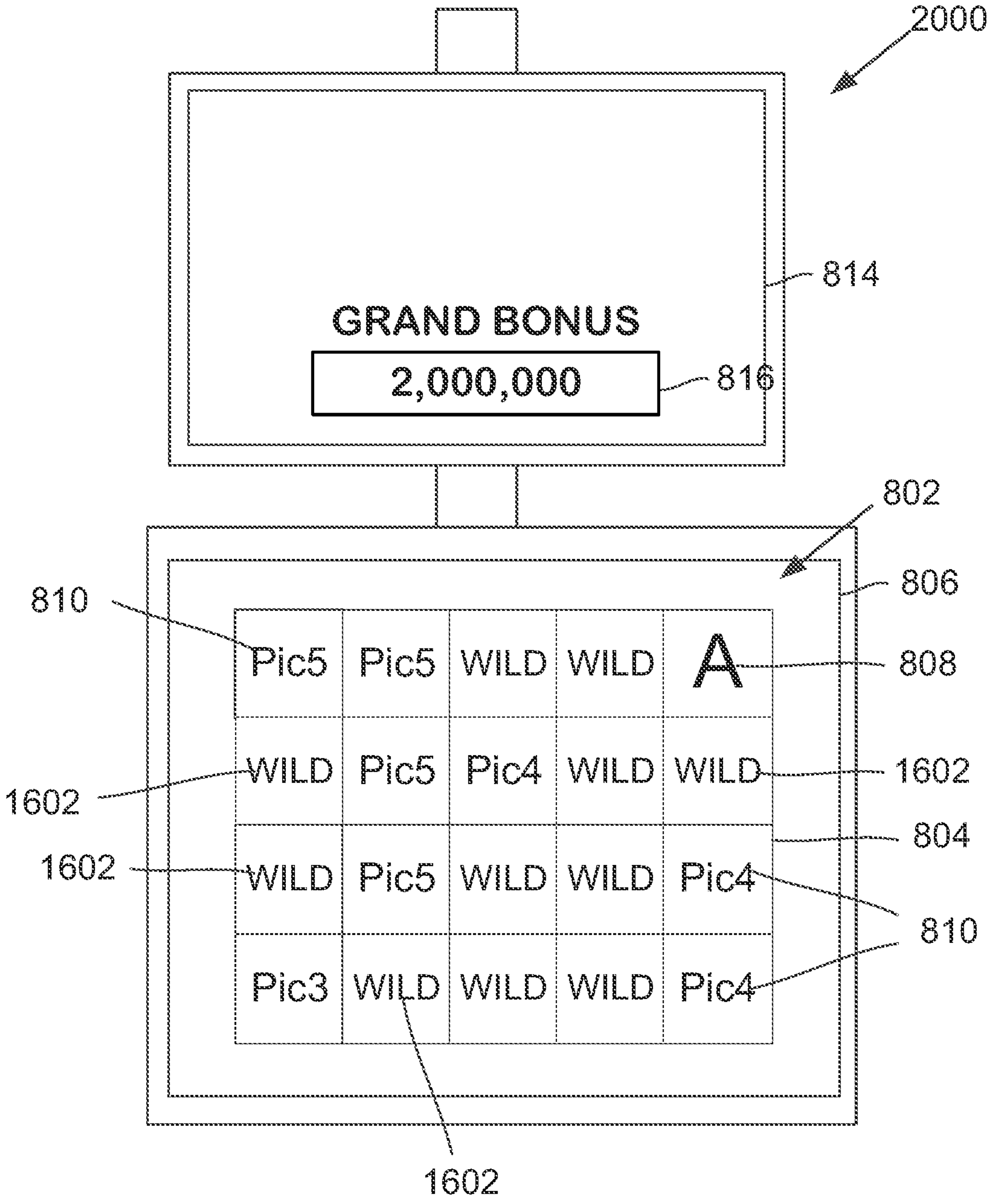
FIG. 20 is an example representation of screens of an EGM during implementation of a first feature game after all wild symbols have been added and the reels have stopped spinning.

During a first feature game, a wild symbol 1602 is added to each marked display position as the reels are spinning, and after the reels have stopped spinning, as shown in FIG. 20, the outcome defined by the displayed symbols is evaluated and a prize awarded if applicable.

The wild markers 812 remain persistent for each subsequent feature game and, as such, a plurality of wild symbols corresponding to the locations of the wild markers are used to evaluate multiple games. In this way, a player is provided with wild symbols, the locations and number of which were at least partly determined during the previous base games, that persist for multiple feature games.

Figure 21:
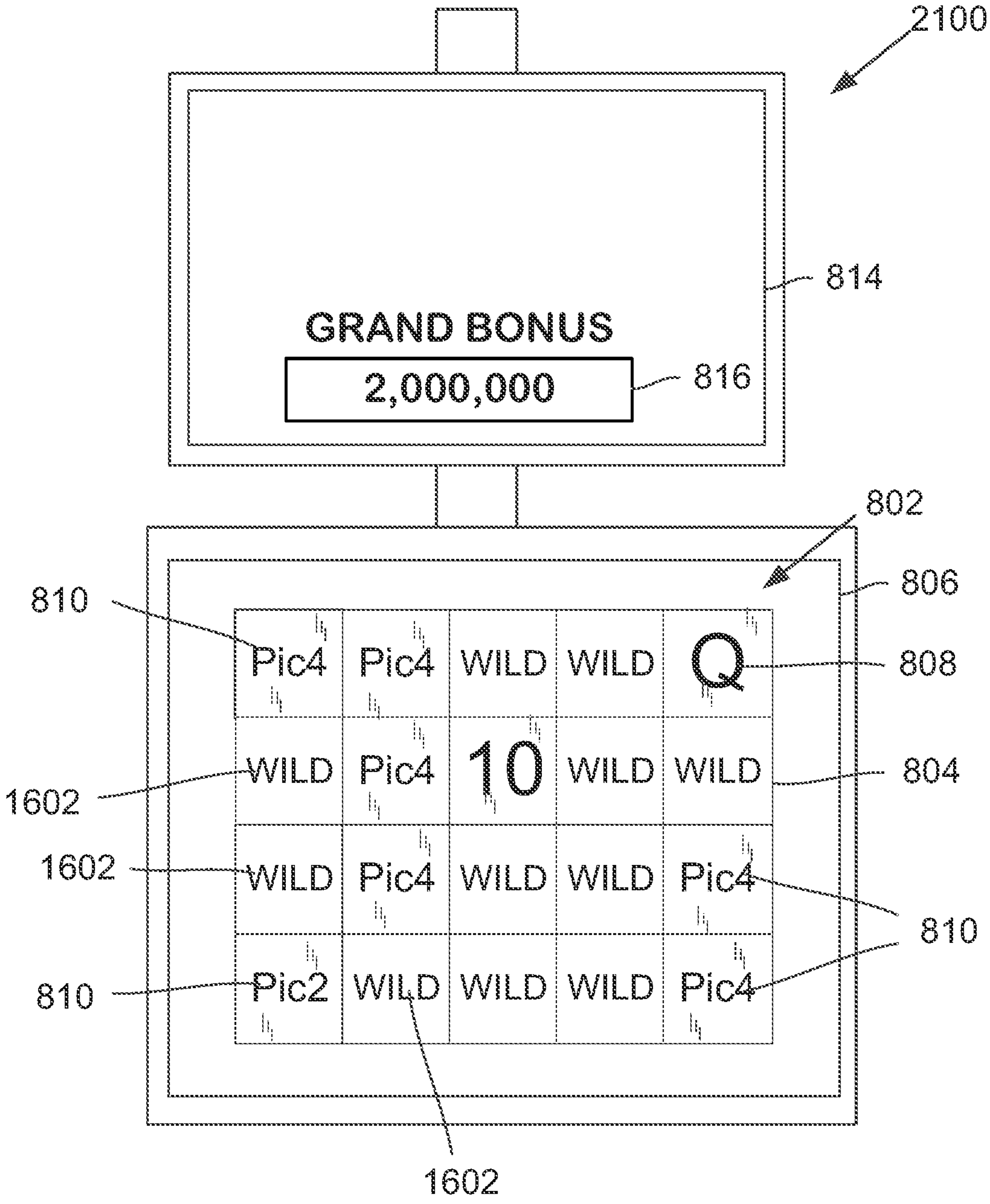
FIG. 21 is an example representation of screens of an EGM during implementation of a second feature game after adding wild symbols to marked display positions and while the reels are spinning.
Figure 22:
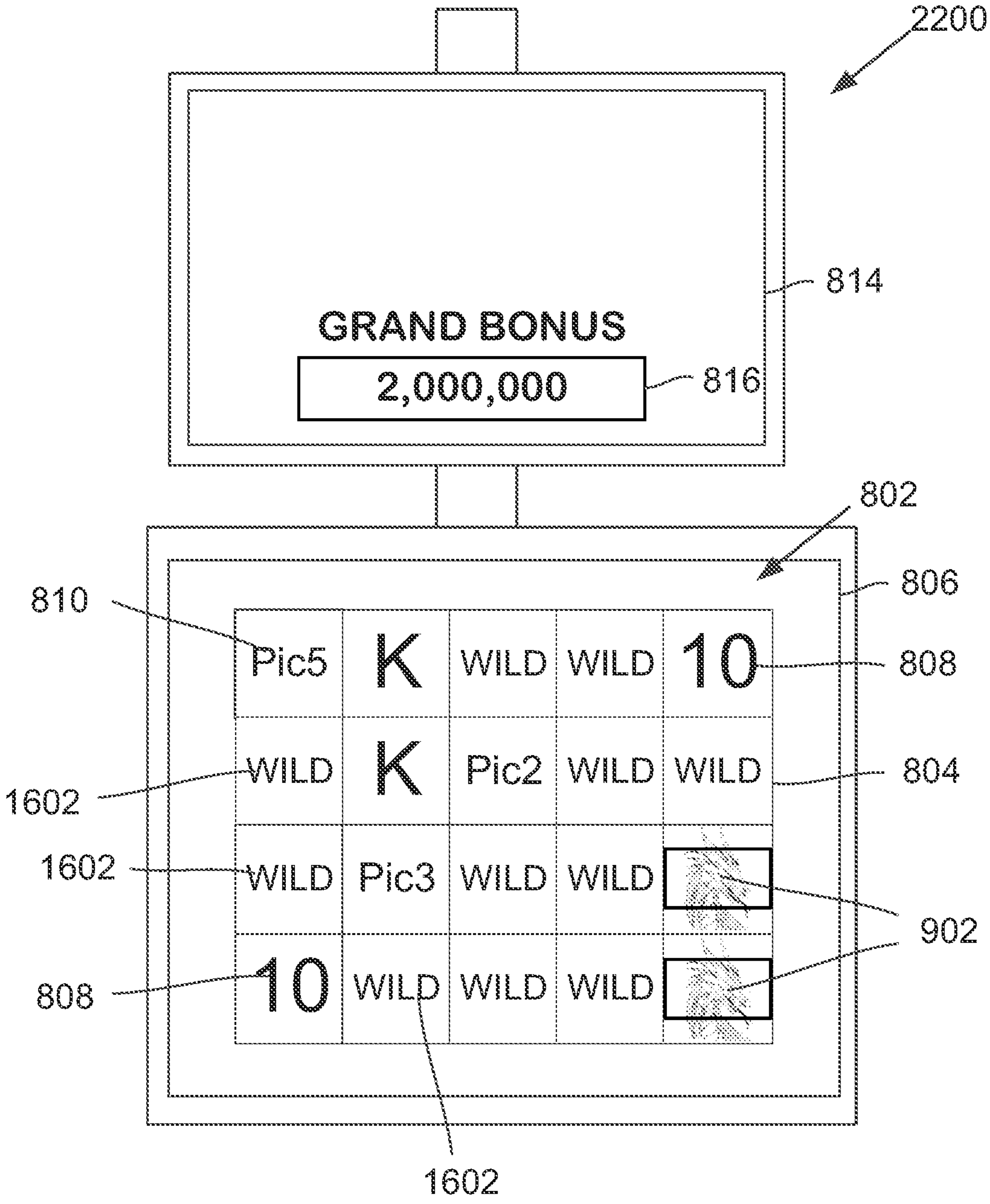
FIG. 22 is an example representation of screens of an EGM during implementation of the second feature game after the reels have stopped spinning.
Figure 23:
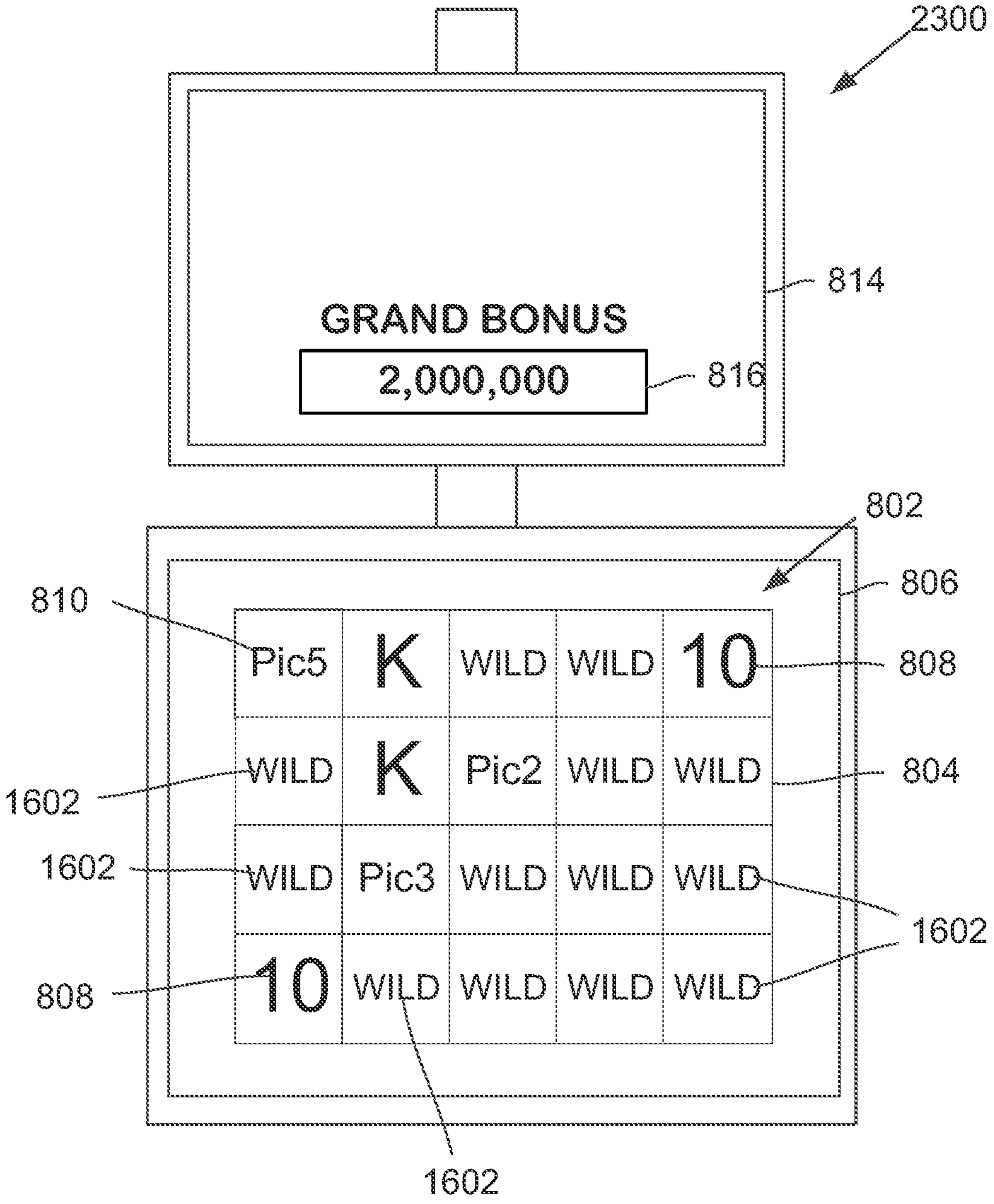
FIG. 23 is an example representation screen of an EGM during implementation of the second feature game after adding wild symbols to marked display positions and after the reels have stopped spinning.

As shown in FIG. 21, during a second feature game, wild symbols 1602 again replace wild markers 812 as the reels are spinning. If a Dragon symbol 902 is displayed in a display position that does not include a wild marker 812 after the reels have stopped spinning, a new wild marker is added to the display position, the new wild marker 812 also remains persistent for subsequent remaining feature games, as shown in FIG. 22. A wild symbol 1602 is also added to each display position that includes a newly added wild marker 812, as shown in FIG. 23.

If, during game play, a player elects to change the denomination, the status of wild markers in terms of the number and locations of wild markers reverts to the wild marker status existing when the selected denomination was last played so that the accumulation of wild marker number and distributions and associated probabilities specific to the denomination.

Figure 29:
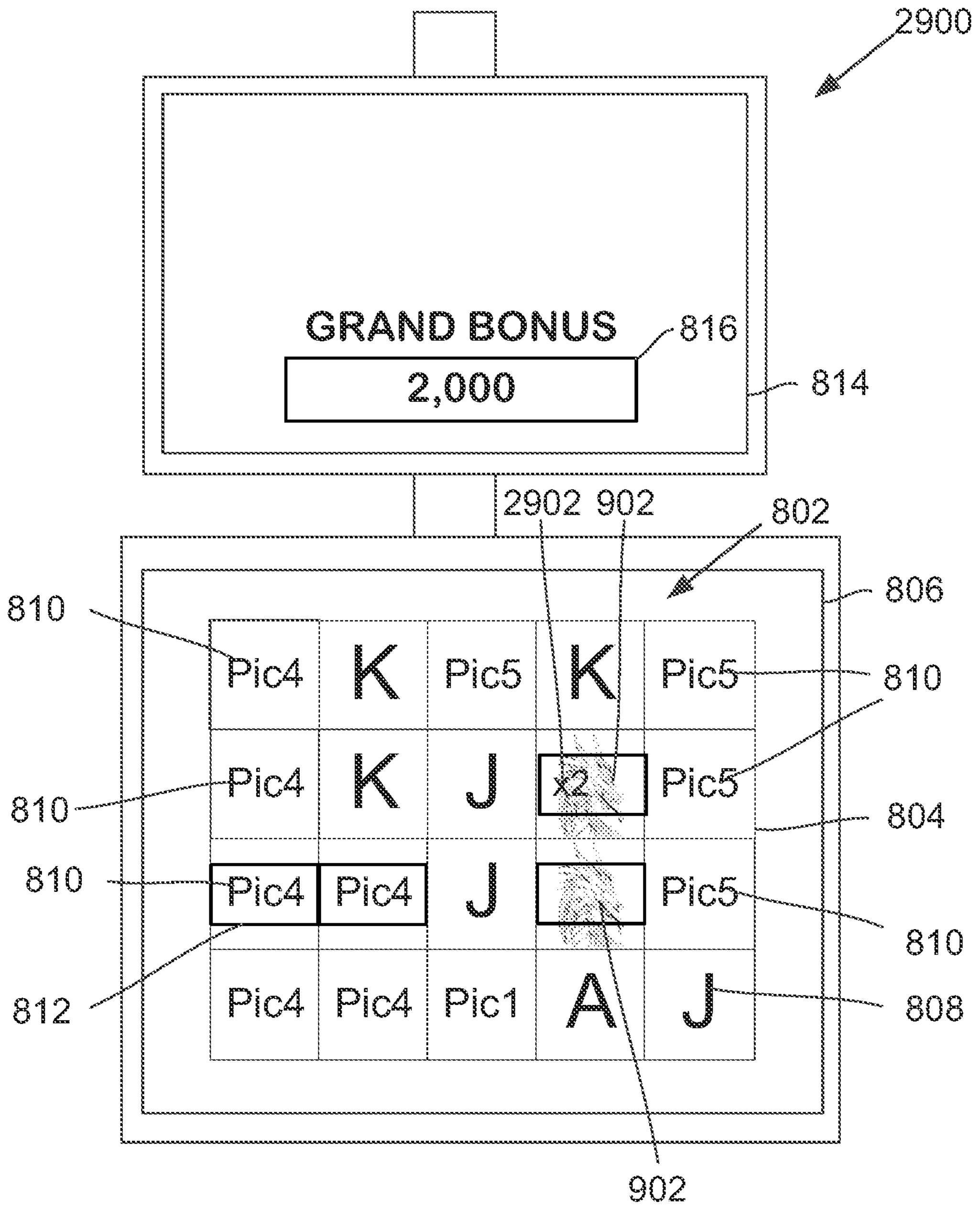
FIG. 29 is an example representation of screens of an EGM in an alternative embodiment.

In the embodiments described above, if a special symbol is displayed at a display position that already includes a wild marker, no action occurs. In an alternate embodiment, as shown in FIG. 29, if special symbol 902 is selected and displayed at a display position but a wild marker 812 is already present at the display position, a multiplier is applied to the added wild symbol during symbol evaluation. Each subsequent selection of a special symbol 902 at the same display position may increase the value of the multiplier to be applied. The increase in the multiplier value for each subsequent selection may be predetermined, such as incrementing the multiplier value by one (i.e. x2, then x3, then x4, and so on) or in a predetermined sequence (e.g. x2, then x5, then x10 and so on). Responsive to any subsequent selection of a special symbol at the same display position, a multiplier indicium 2902 may be additionally displayed, next to the existing wild marker 812, to indicate the multiplier value to be applied.

Figure 30:
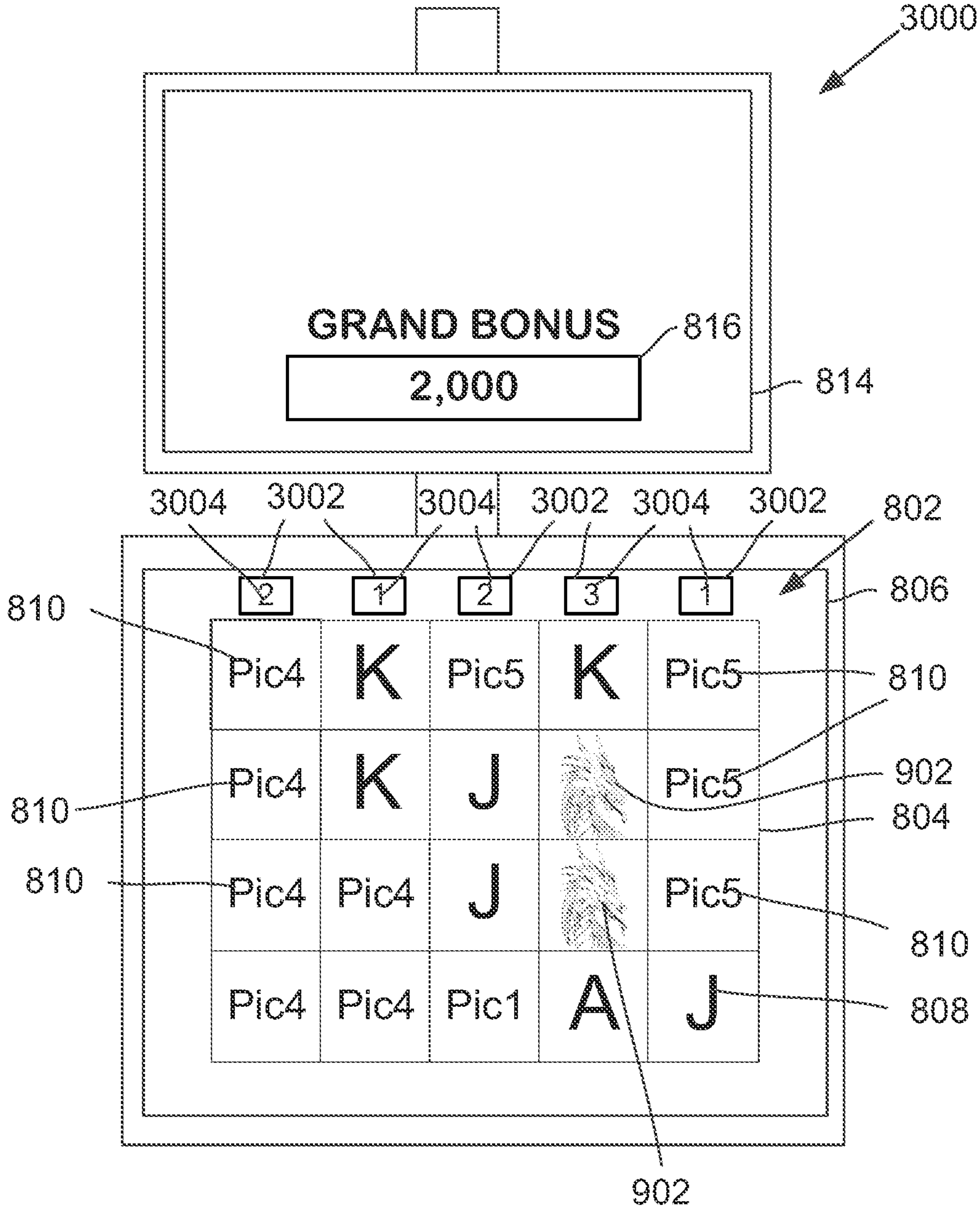
FIG. 30 is an example representation of screens of an EGM in a further alternative embodiment.

In the foregoing examples, each wild marker 812 marks a single display position for the potential addition of a wild symbol. In alternative examples, a wild marker marks more than one display position, such as a single column, for the potential addition of one or more wild symbols to the column. In such an alternative example, as shown in FIG. 30, a wild marker 3002 is displayed at the top of each column that is to receive a wild symbol 812 when a trigger condition occurs, together with an indication of the number 3004 of special symbols that have been selected in the column. The number 3004 of display positions to receive a wild symbol in a column may be based on the number of special symbols that were selected in the column. For instance, each selected special symbol 902 corresponds to one potential addition of a wild symbol 1602 within the column, with the placement of added wild symbol(s) being random within the column, or based on predetermined criteria, such as in a predetermined order. In one example, wild symbols 1602 are added from the bottom row towards the top row in a column for each selected special symbol. If the column is filled up to the top row with wild symbols, then a multiplier may be applied, from the bottom row towards the top tow, for each remaining selected special symbol.

In accordance with a first aspect of the present disclosure, there is provided a gaming system comprising: at least one display; a game controller that includes at least one processor and at least one memory device, wherein: the at least one processor, the at least one memory device, and the at least one display are operably connected; and the at least one memory device stores computer-readable instructions for controlling the at least one processor to: select and display a plurality of symbols in a respective plurality of display positions in a display area for each implemented game; add a wild marker to each display position that includes a special symbol, each wild marker remaining persistent for subsequent games until a random trigger condition occurs; when a random trigger condition occurs, add a wild symbol to each display position that includes a wild marker; evaluate a game outcome based on the selected and displayed symbols inclusive of all added wild symbols; and award a win amount if the outcome corresponds to a winning outcome.

In an embodiment, the random trigger condition comprises a first trigger condition that is not dependent on the symbols selected and displayed in the display area, and the at least one memory device stores computer-readable instructions for controlling the at least one processor to remove all wild markers prior to implementation of a subsequent game if a first trigger condition has occurred.

In an embodiment, the at least one memory device stores computer-readable instructions for controlling the at least one processor such that the likelihood of obtaining a trigger condition generally increases as the number of successive games played without a first trigger condition occurring increases.

In an embodiment, the at least one memory device stores computer-readable instructions for controlling the at least one processor to make a determination as to whether to add at least one further wild marker to at least one respective display position before evaluation of the game outcome.

In an embodiment, the number of further wild markers to add is at least partly dependent on the number of wild markers already present in the display area.

In an embodiment, the at least one memory device stores computer-readable instructions for controlling the at least one processor to add at least one initial wild marker to at least one respective display position after evaluation of the game outcome and prior to implementation of a subsequent game.

In an embodiment, the at least one memory device stores computer-readable instructions for controlling the at least one processor to add a randomly determined number of initial wild markers to at least one respective display position after evaluation of the game outcome and prior to implementation of a subsequent game.

In an embodiment, the randomly determined number of initial wild markers is between 1 and 5.

In an embodiment, the random trigger condition comprises a second trigger condition that is dependent on the symbols selected and displayed in the display area, and the at least one memory device stores computer-readable instructions for controlling the at least one processor to: implement a plurality of feature games when the second trigger condition exists, wherein during the feature games the wild markers are persistent for all feature games; for each feature game: add a wild symbol to each display position that includes a wild marker; evaluate a game outcome based on the selected and displayed symbols inclusive of all added wild symbols; and award a win amount if the outcome corresponds to a winning outcome; and after completion of the plurality of feature games, remove all wild markers prior to implementation of a subsequent game.

In an embodiment, the second trigger condition comprises selection and display in the display area of a defined combination of symbols, such as at least three defined trigger symbols.

In an embodiment, the at least one memory device stores computer-readable instructions for controlling the at least one processor to add at least one initial wild marker to at least one respective display position prior to implementation of a subsequent game and after all feature games have been completed.

In an embodiment, the at least one memory device stores computer-readable instructions for controlling the at least one processor to add a randomly determined number of initial wild markers to at least one respective display position prior to implementation of a subsequent game after all feature games have been completed.

In an embodiment, the randomly determined number of initial wild markers is between 1 and 5.

In an embodiment, the at least one memory device stores computer-readable instructions for controlling the at least one processor to implement an animation on the display to indicate to a player that a trigger condition has occurred.

In an embodiment, the at least one memory device stores computer-readable instructions for controlling the at least one processor to award a bonus prize if a bonus condition exists.

In an embodiment, the bonus condition comprises display of a wild marker at each display position of the display area.

In an embodiment, the at least one memory device stores computer-readable instructions for controlling the at least one processor to: enable a player to select from a plurality of bet denominations; wherein if a change is made to the bet denomination, the number and locations of wild markers changes to the number and locations of wild markers existing when the denomination was last equal to the selected denomination.

In accordance with a second aspect of the present disclosure, there is provided a gaming system comprising: at least one display; a game controller that includes at least one processor and at least one memory device, wherein: the at least one processor, the at least one memory device, and the at least one display are operably connected; and the at least one memory device stores computer-readable instructions for controlling the at least one processor to: implement a base game wherein: a plurality of symbols are selected and displayed in a respective plurality of display positions in a display area; and a wild marker is added to each display position that includes a special symbol, each wild marker remaining persistent for subsequent base games until a feature trigger condition occurs; and implement a feature comprising a plurality of feature games when the feature trigger condition occurs, wherein during each feature game: a wild symbol is added to each display position that includes a wild marker; a game outcome is evaluated based on the selected and displayed symbols inclusive of all added wild symbols; and a win amount is awarded if the outcome corresponds to a winning outcome; wherein the number of wild symbols used to determine the game outcome during each feature game is at least partly dependent on the number of wild markers accumulated during the base games prior to occurrence of a feature trigger condition.

In accordance with a third aspect of the present disclosure, there is provided a method of gaming comprising: selecting a plurality of symbols from a set of symbols; displaying the selected symbols in a respective plurality of display positions in a display area for each implemented game; adding a wild marker to each display position that includes a special symbol, each wild marker remaining persistent for subsequent games until a random trigger condition occurs; when a random trigger condition occurs, adding a wild symbol to each display position that includes a wild marker; evaluating a game outcome based on the selected and displayed symbols inclusive of all added wild symbols; and awarding a win amount if the outcome corresponds to a winning outcome.

In accordance with a fourth aspect of the present disclosure, there is provided a gaming system comprising: at least one display; a game controller that includes at least one processor and at least one memory device, wherein: the at least one processor, the at least one memory device, and the at least one display are operably connected; and the at least one memory device stores computer-readable instructions for controlling the at least one processor to: select and display a plurality of symbols in a respective plurality of display positions in a display area for each implemented game; display at least one wild marker when a special symbol is displayed in the display area, the at least one wild marker indicative of a current number of wild symbols to add to the display area when a random trigger condition occurs, and the at least one wild marker remaining persistent for subsequent games until the random trigger condition occurs; when a random trigger condition occurs, add at least one wild symbol to the display area such that at least one wild symbol according to the current number of wild symbols is added to at least one respective display position the display area; evaluate a game outcome based on the selected and displayed symbols inclusive of all added wild symbols; and award a win amount if the outcome corresponds to a winning outcome.

In an embodiment, the plurality of display positions are configured in a plurality of rows and a plurality of columns, and wherein the at least one memory device stores computer-readable instructions for controlling the at least one processor to display a wild marker for each row or each column, each wild marker indicative of a current number of wild symbols to add to the respective row or column when a random trigger condition occurs.

In an embodiment, the at least one memory device stores computer-readable instructions for controlling the at least one processor such that when a random trigger condition occurs, the current number of wild symbols are randomly added to the display positions.

In an embodiment, the at least one memory device stores computer-readable instructions for controlling the at least one processor such that when a random trigger condition occurs, the current number of wild symbols are added to the display positions according to defined criteria.

In an embodiment, the at least one memory device stores computer-readable instructions for controlling the at least one processor such that when a random trigger condition occurs, the current number of wild symbols are added to each column of display positions in a defined order.

In an embodiment, the defined order is from bottom to top or from top to bottom.

In an embodiment, if a special symbol is displayed at a display position that already includes a wild marker, a multiplier is applied to the wild symbol added to the display position.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
at least one server; and
a user mobile device, coupled to the server, comprising a display with a plurality of display positions, a device processor, memory, and computer-readable instructions that, when executed, cause the device processor to control the display to:
during each instance of a base game:
display, at the plurality of display positions, a plurality of symbols based on data received from the server, the data having been generated by the server using a weighting table, comprising a plurality of precalculated weights that control a likelihood of landing a given symbol within the plurality of symbols, and one or more random numbers generated by a random number generator
initiate a feature game in response to a trigger condition occurring during an instance of the base game;
in the feature game, for each display position that has a wild marker recorded in a data structure:
modify the display position to display a wild symbol, such that a total number of wild symbols displayed in the feature game corresponds to a total number of wild markers accumulated from previous base game instances, and
animate the modification of the display position using an animation sequence, wherein the animation sequence is displayed by the user mobile device using a graphics subsystem; and
display an award in response to receiving, from the server, data indicative of a winning game outcome corresponding to the award, wherein the winning game outcome is based at least in part on the wild symbols displayed in the feature game.

2. The electronic gaming system of claim 1, wherein the computer-readable instructions, when executed, further cause the device processor to, when a random wild trigger condition occurs:
cause each of the display positions that displays the wild marker to animate an additional wild symbol; and
receive, from the at least one server, data indicative of a second award when the plurality of symbols displayed correspond to a second winning outcome.

3. The electronic gaming system of claim 1, wherein the computer-readable instructions, when executed, further cause the device processor to increase a likelihood of obtaining a random wild trigger condition as a number of successive instances of the base game increases without the random wild trigger condition being met.

4. The electronic gaming system of claim 1, wherein the computer-readable instructions, when executed, further cause the device processor to initiate a further feature game when the trigger condition occurs during the feature game.

5. The electronic gaming system of claim 1, wherein the computer-readable instructions, when executed, further cause the device processor to receive, from the server, data indicative of a randomly determined number of initial wild markers to the display positions prior to animating a subsequent base game after the feature game has been completed.

6. The electronic gaming system of claim 1, wherein the computer-readable instructions, when executed, further cause the device processor to receive a bet selection from a plurality of bet denominations, the bet selection corresponding to a number of wild markers, and to change the number of wild markers to a different number of wild markers to be displayed before the bet selection is made when the bet selection is changed.

7. The electronic gaming system of claim 6, wherein the computer-readable instructions, when executed, further cause the device processor to replace the display positions having the number of wild markers with a different set of display positions having the number of wild markers.

8. A method of increasing an award on an electronic gaming system having at least one server coupled to a gaming device, the gaming device comprising a display with a plurality of display positions, and the at least one server comprising a server processor and a server memory, the method comprising:
transmitting, from the at least one server, data associated with a game outcome based on a weighting table and a random number generated by a random number generator, the weighting table including a plurality of precalculated weights that control a likelihood of landing a given symbol within the plurality of symbols;

controlling the display to modify a first display position that displays a special symbol in the game outcome in a current game instance to additionally animate a wild marker to be retained on the display for a subsequent game instance until a trigger condition occurs, thereby visually animating the display to add the wild marker to a total number of accumulated wild markers from previous game instances at the plurality of display positions, the trigger condition being determined using the random number generator and symbol-dependent criteria;

controlling the display to modify each display position that displays the wild marker on the display to further animate in a feature game a wild symbol, depending on the total number of accumulated wild markers from previous game instances when the trigger condition occurs;

determining the game outcome in the feature game, and controlling the display to animate an award when the game outcome corresponds to a winning outcome.

9. The method of claim 8, further comprising, when a random wild trigger condition occurs:

causing each of the display positions that displays the wild marker to animate an additional wild symbol by transmitting the data; and causing, from the at least one server, data indicative of a second award when a plurality of symbols displayed correspond to a second winning outcome by transmitting the data.

10. The method of claim 8, further comprising increasing a likelihood of obtaining a random wild trigger condition as a number of successive base games played increases without the random wild trigger condition being met.

11. The method of claim 8, further comprising initiating a further feature game when the trigger condition occurs during the feature game.

12. The method of claim 8, further comprising transmitting, from the at least one server, data associated with a randomly determined number of initial wild markers to the display positions prior to animating a subsequent base game after the feature game has been completed.

13. The method of claim 8, further comprising receiving a bet selection from a plurality of bet denominations, the bet selection corresponding to a number of wild markers, and changing the number of wild markers to a different number of wild markers to be displayed before the bet selection is made when the bet selection is changed.

14. The method of claim 13, further comprising changing the display positions having the number of wild markers to a different set of display positions.

15. A non-transitory computer-readable medium comprising a plurality of device instructions in a remote gaming device that provides a display with a plurality of display positions and includes a device processor, the remote gaming device being networked to at least one server, the at least one server comprising a server memory, and the device instructions, which, when executed, cause the device processor to perform the steps of:

controlling the display to display at the plurality of display positions in a current game instance a plurality of symbols being selected based on data indicative of a weighting table and a random number generated by a random number generator received from the at least one server, the weighting table including a plurality of precalculated weights, each associated with a respective symbol of a symbol set and stored in the memory, that control a likelihood of landing a given symbol within the plurality of symbols;

controlling the display to modify a first display position that displays a special symbol to additionally animate a wild marker on the display until a trigger condition occurs, thereby visually animating the display to add the wild marker to a total number of accumulated wild markers from previous game instances on the display;

retaining the wild marker for a subsequent game instance;

controlling the display to modify each display position that displays the wild marker to additionally animate a wild symbol in a feature game, depending on the total number of accumulated wild markers when the trigger condition occurs;

determining a game outcome for the display based on the plurality of symbols displayed, and controlling the display to animate an award when the game outcome corresponds to a winning outcome.

16. The non-transitory computer-readable medium of claim 15, wherein the device instructions, when executed, cause the device processor to perform the step of, when a random wild trigger condition occurs:

animating at each of the display positions that displays the wild marker an additional wild symbol; and receiving, from the at least one server, data indicative of a second award when the plurality of symbols displayed correspond to a second winning outcome.

17. The non-transitory computer-readable medium of claim 15, wherein the device instructions, when executed, cause the device processor to perform the step of increasing a likelihood of obtaining a random wild trigger condition as a number of successive base games played increases without the random wild trigger condition being met.

18. The non-transitory computer-readable medium of claim 15, wherein the device instructions, when executed, cause the device processor to perform the step of initiating a further feature game when the trigger condition occurs during the feature game.

19. The non-transitory computer-readable medium of claim 15, wherein the device instructions, when executed, cause the device processor to perform the step of receiving, from the at least one server, data indicative of a randomly determined number of initial wild markers to the display positions prior to animating a subsequent base game after the feature game has been completed.

20. The non-transitory computer-readable medium of claim 15, wherein the device instructions, when executed, cause the device processor to perform the step of receiving a bet selection from a plurality of bet denominations, the bet selection corresponding to a number of wild markers, changing the number of wild markers to a different number of wild markers to be displayed before the bet selection is made when the bet selection is changed, and changing the display positions having the number of wild markers to a different set of display positions.

* * * * *